Figure 1:
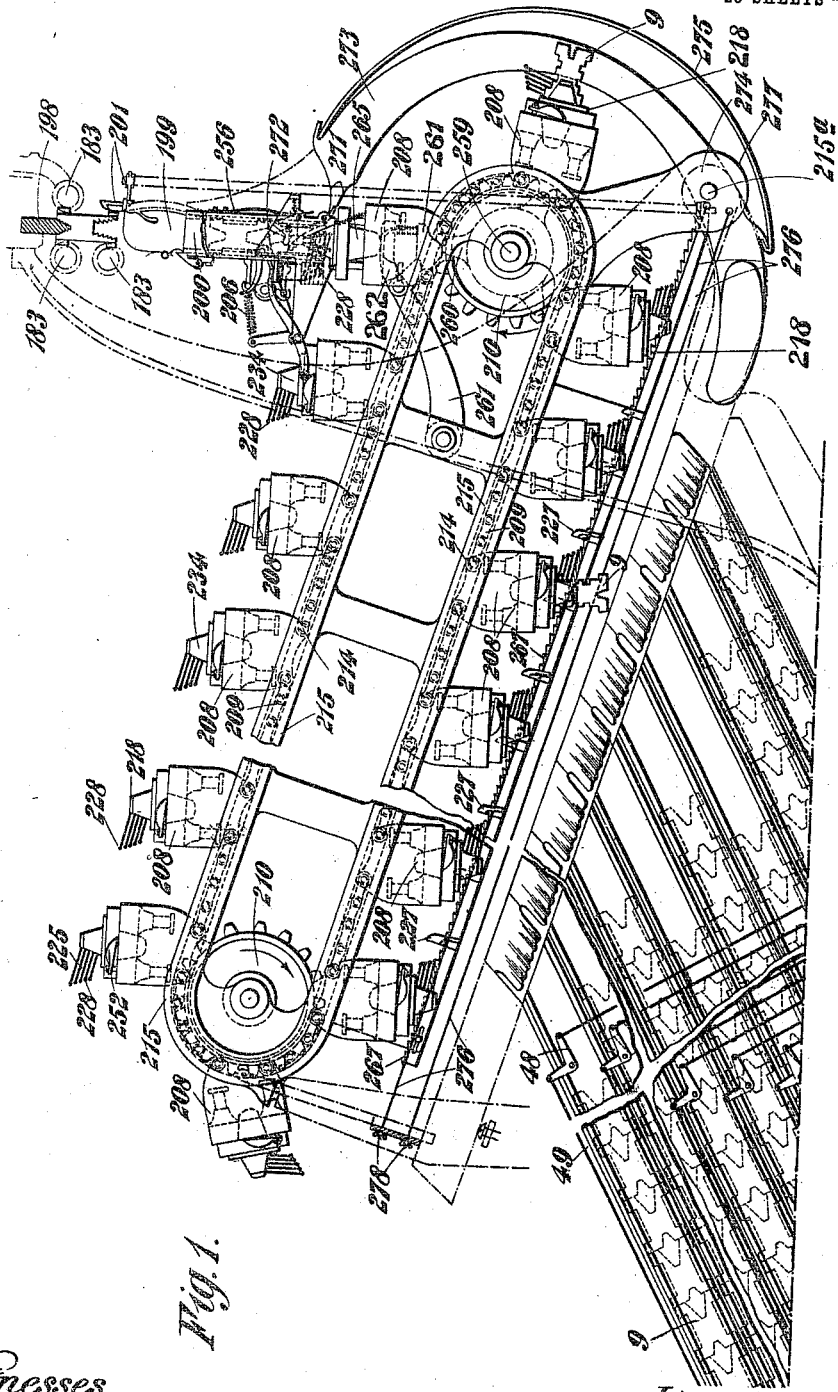

W. E. ELLIOTT.
LINOTYPE MACHINE.
APPLICATION FILED JUNE 1, 1908.

973,181.

Patented Oct. 18, 1910.
23 SHEETS—SHEET 1.

Witnesses
A. King
G. W. Hartley

Inventor
W. E. Elliott
per
P. J. Noah, Attorney

W. E. ELLIOTT.
LINOTYPE MACHINE.
APPLICATION FILED JUNE 1, 1908.
973,181.
Patented Oct. 18, 1910.
23 SHEETS—SHEET 2.
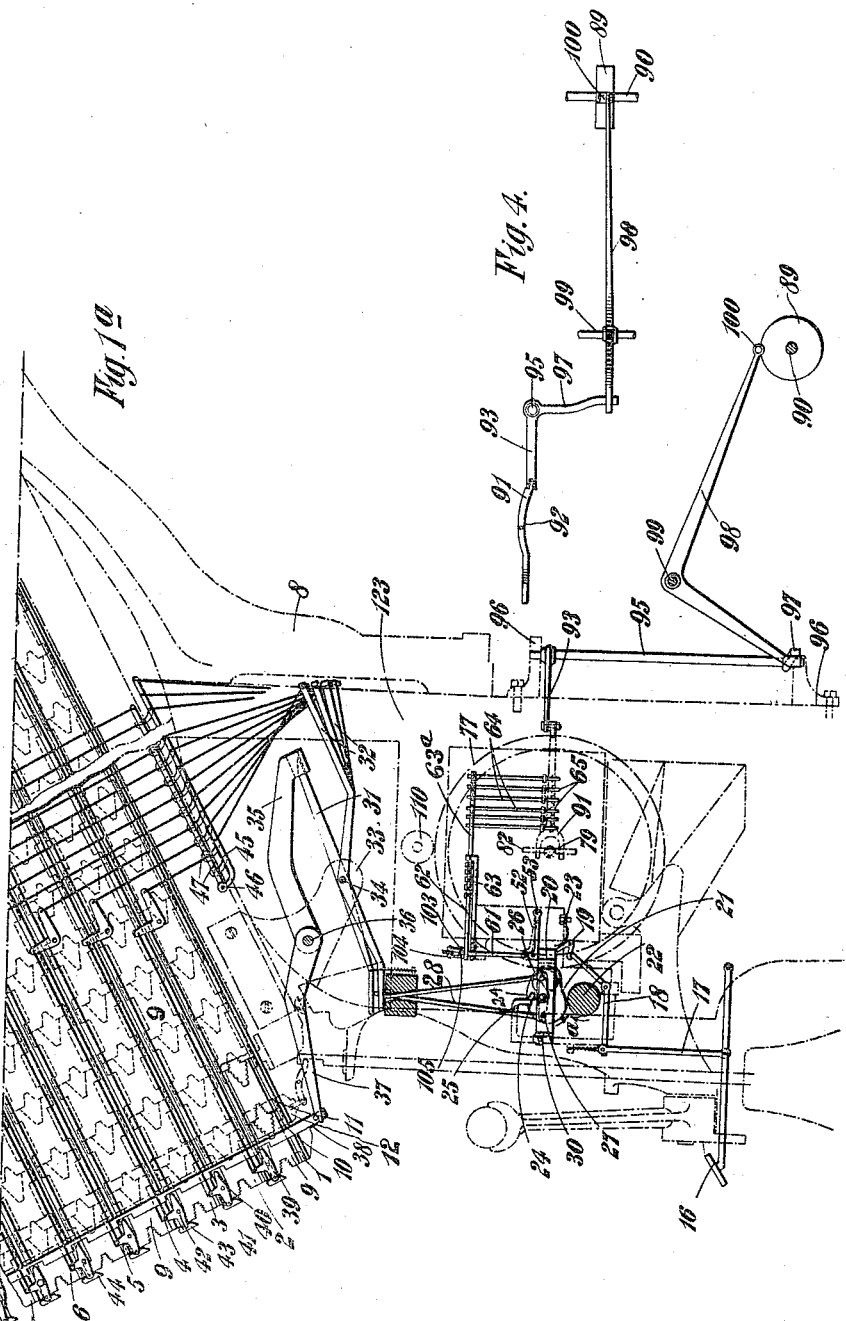

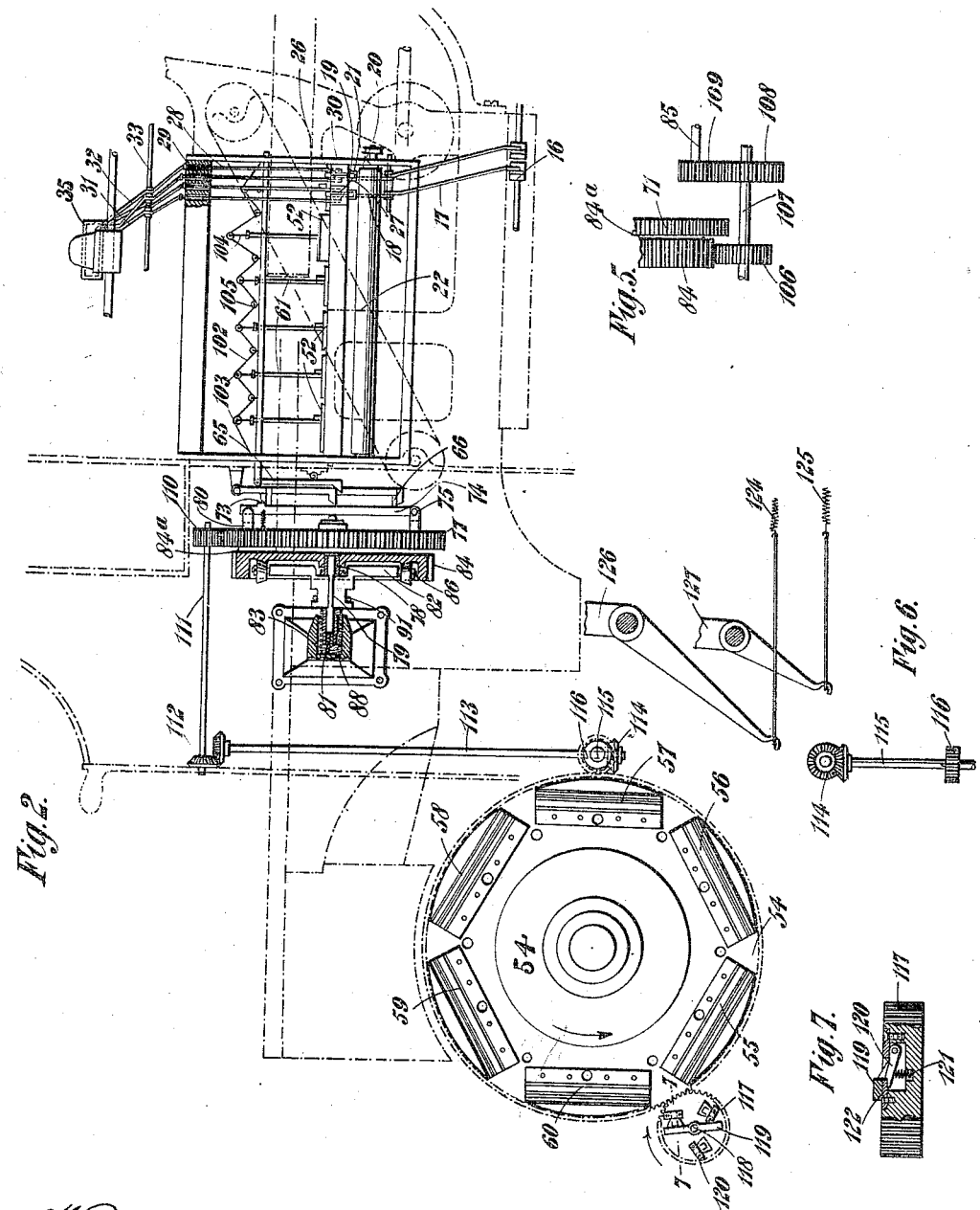

W. E. ELLIOTT.
LINOTYPE MACHINE.
APPLICATION FILED JUNE 1, 1908.

973,181.

Patented Oct. 18, 1910.
23 SHEETS—SHEET 4.

Witnesses
A. King
G. W. Hartley

Inventor
W. E. Elliott
per P. J. Dodd, Attorney

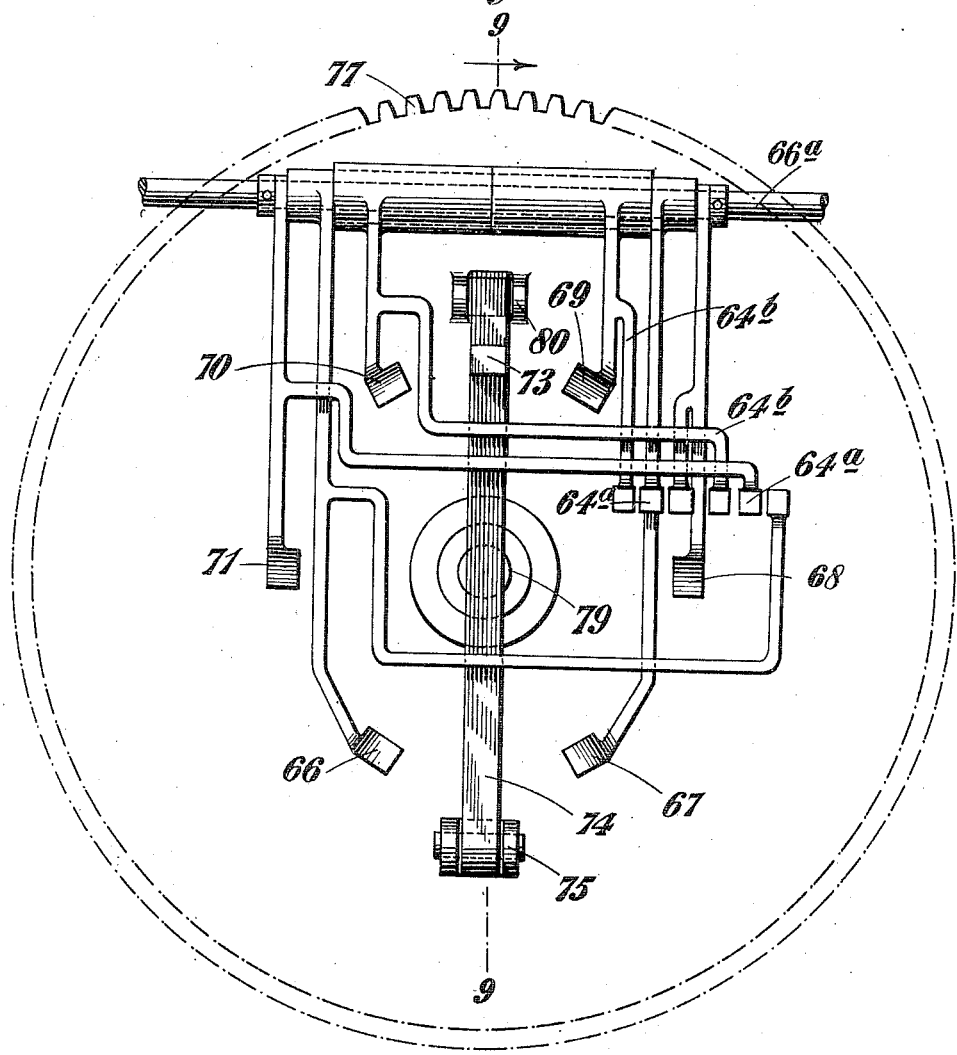

W. E. ELLIOTT.
LINOTYPE MACHINE.
APPLICATION FILED JUNE 1, 1908.

973,181.

Patented Oct. 18, 1910.
23 SHEETS—SHEET 6.

Witnesses
A. Kunz
G. D. Hartley

Inventor
W. E. Elliott
per C. S. Imay, Attorney

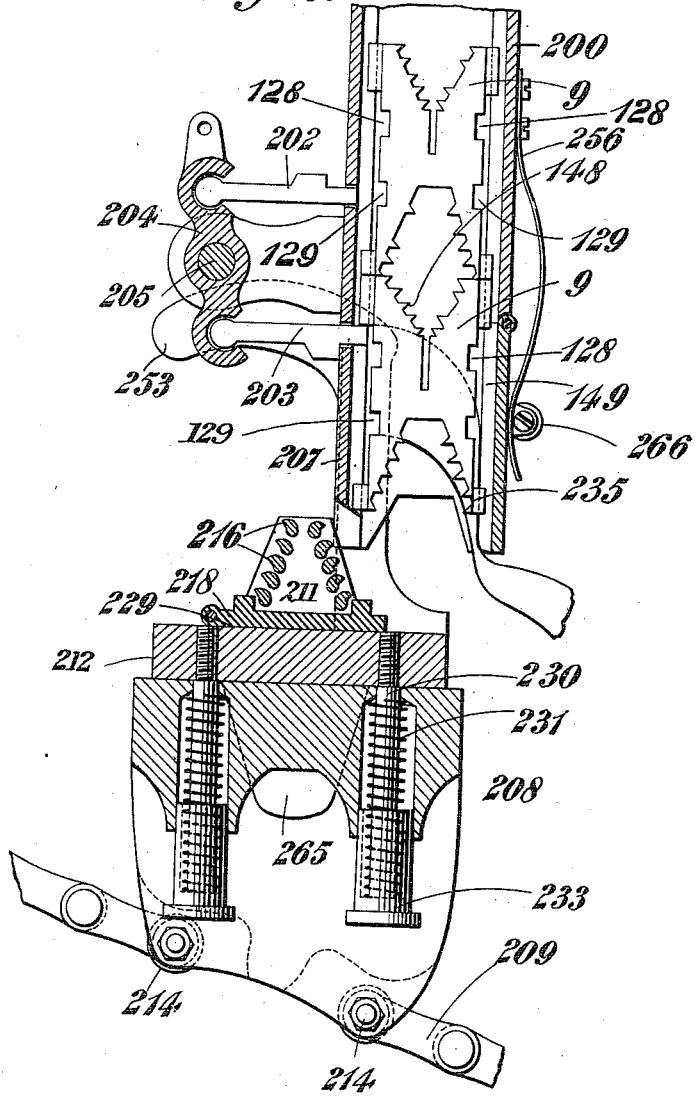

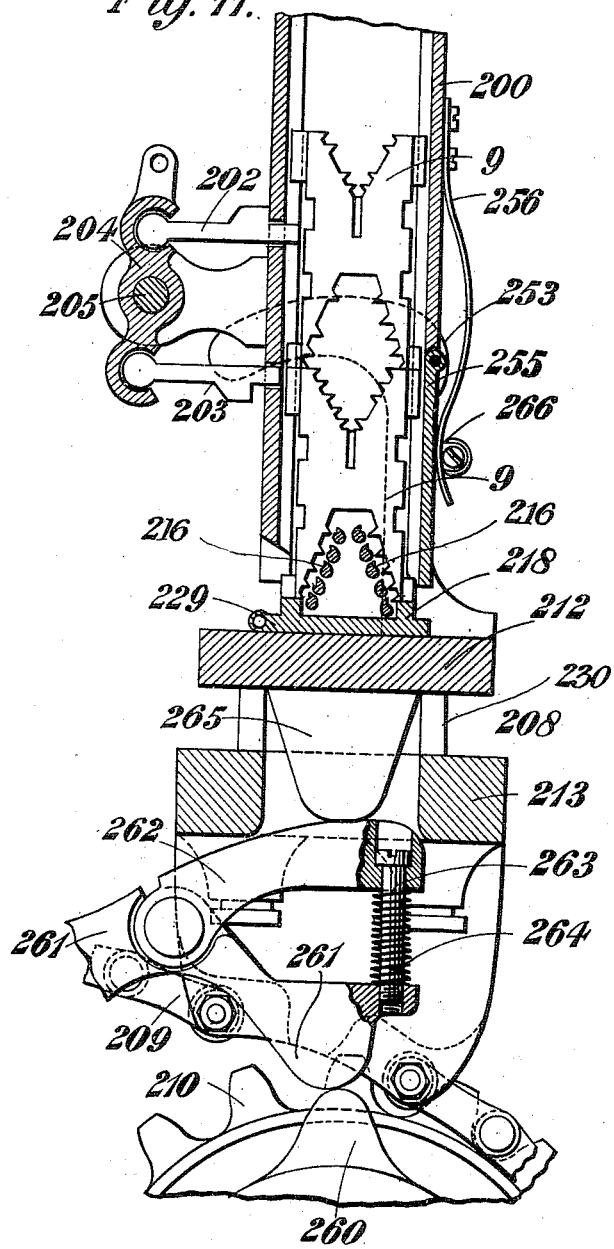

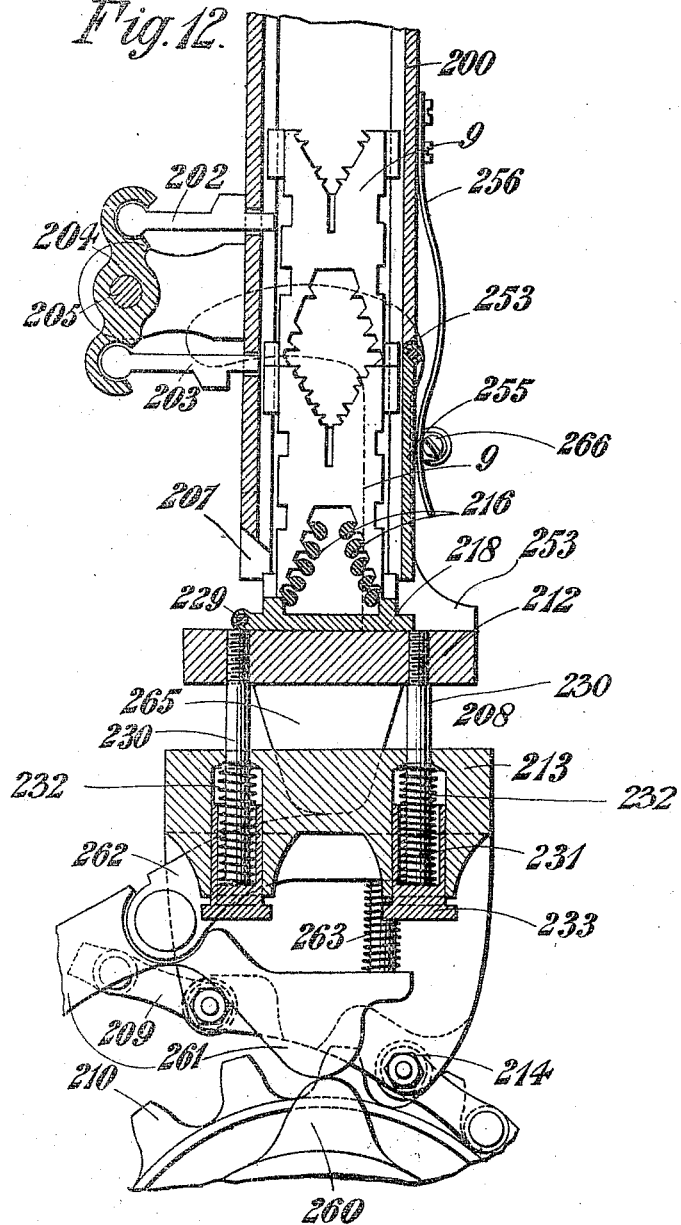

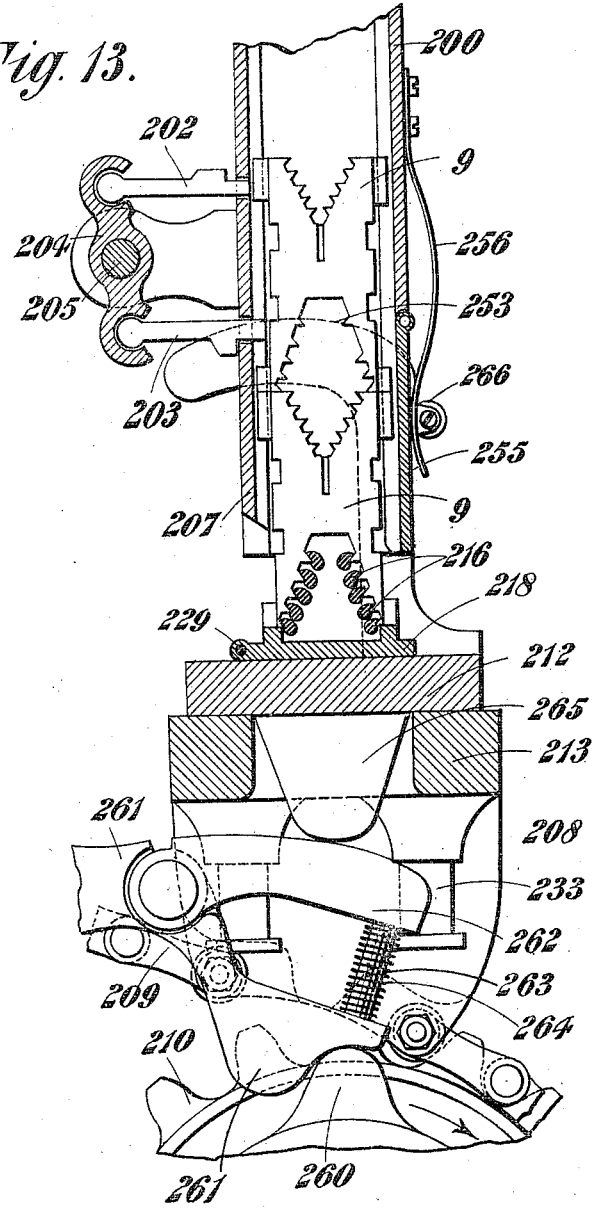

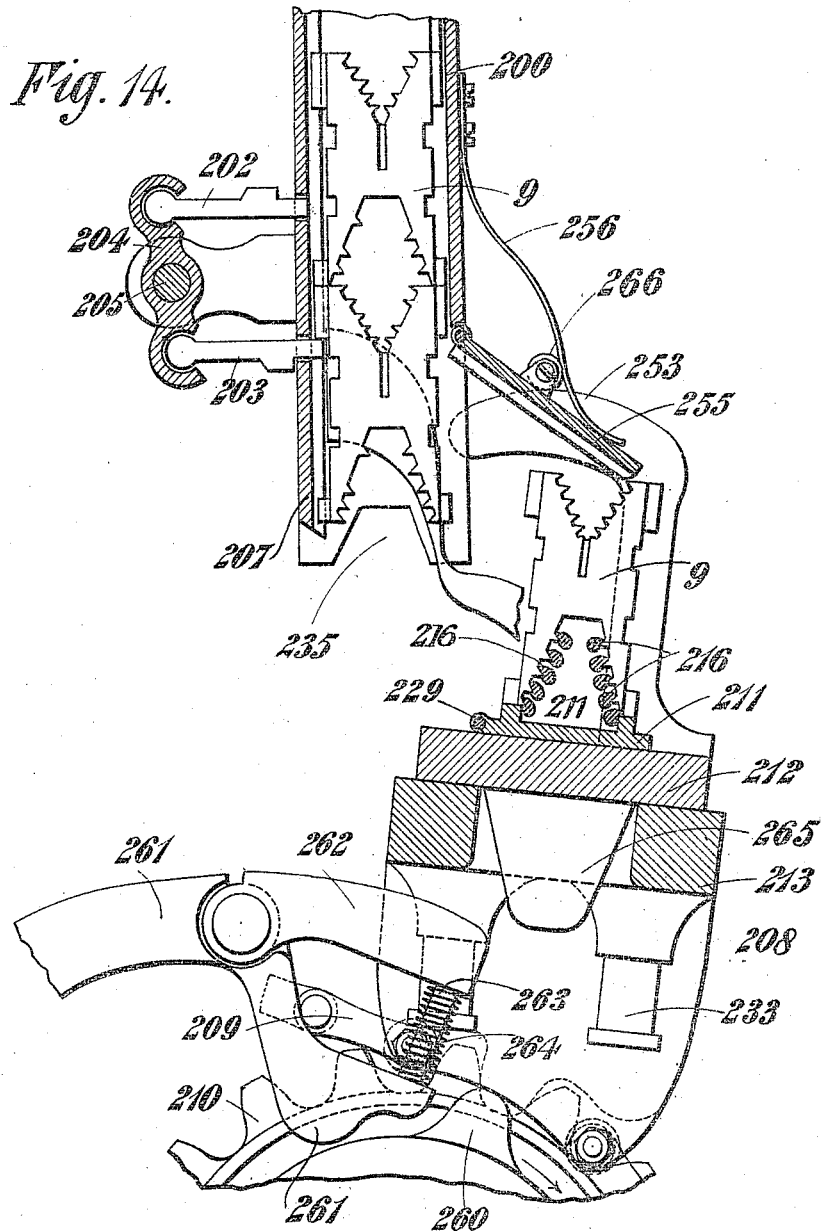

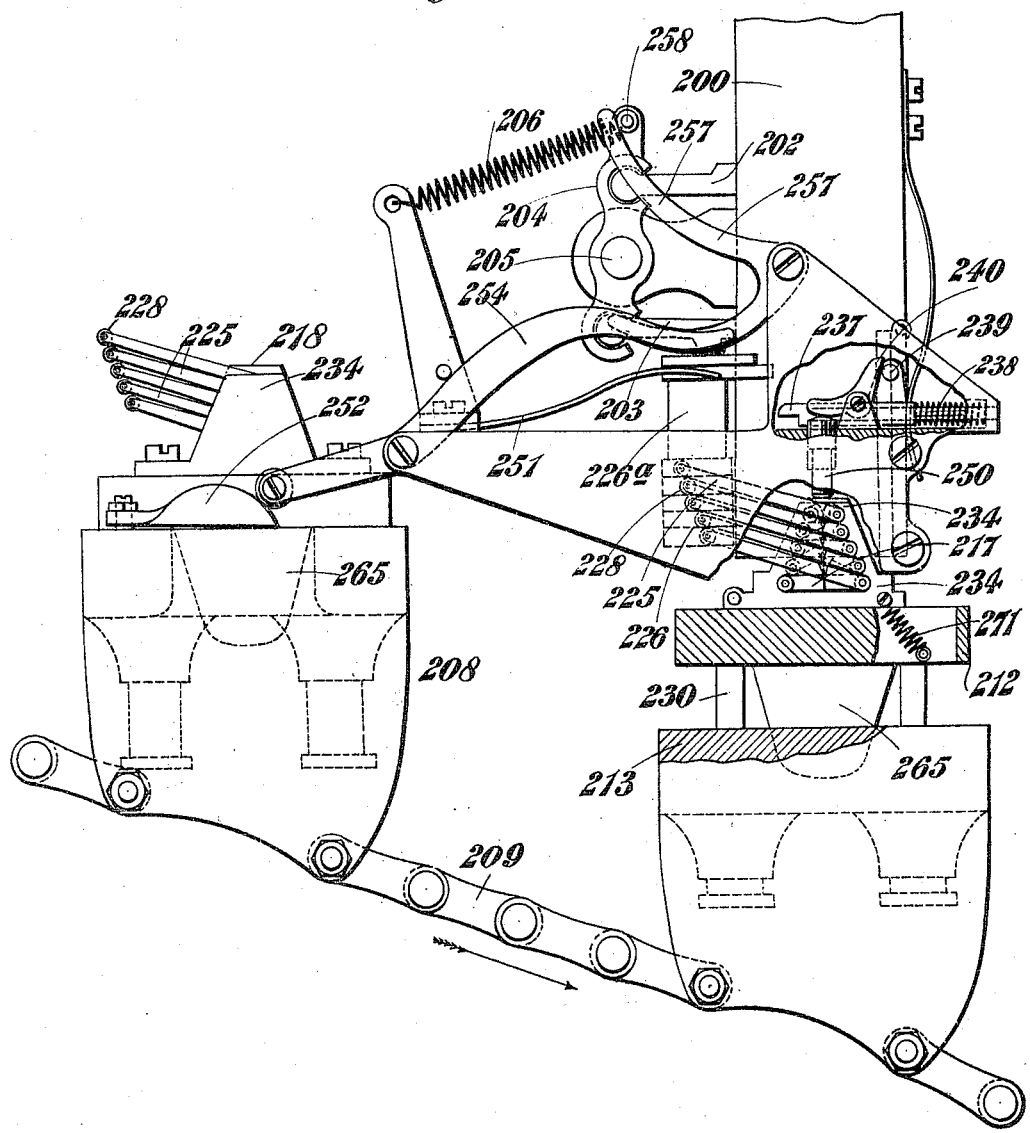

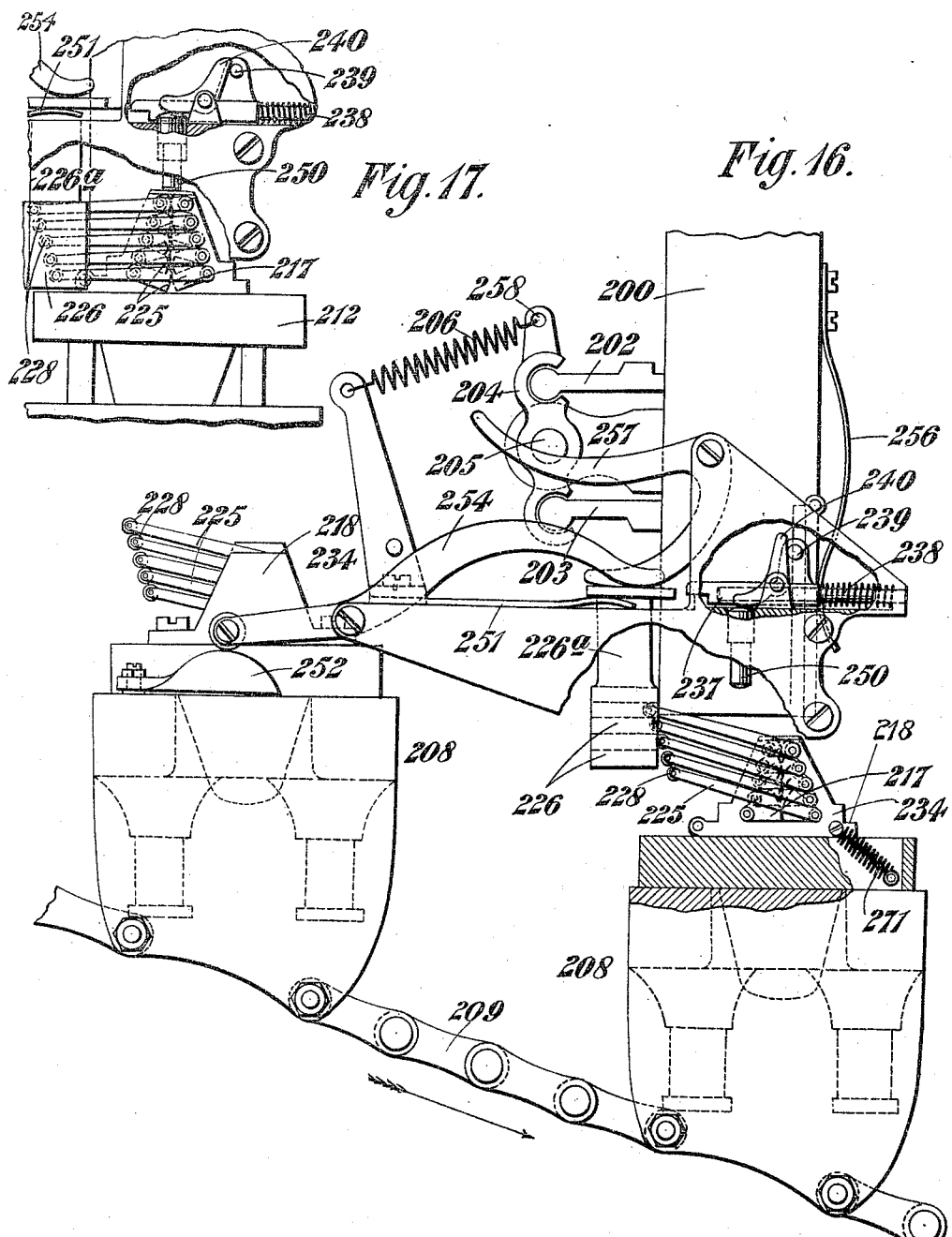

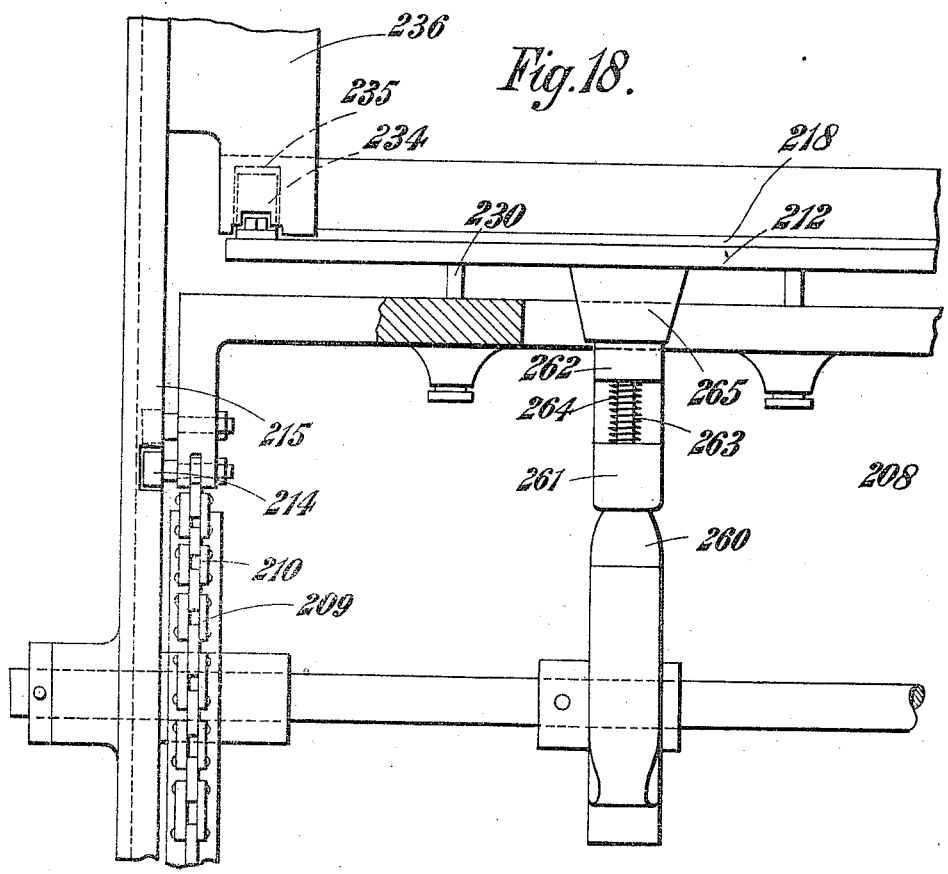

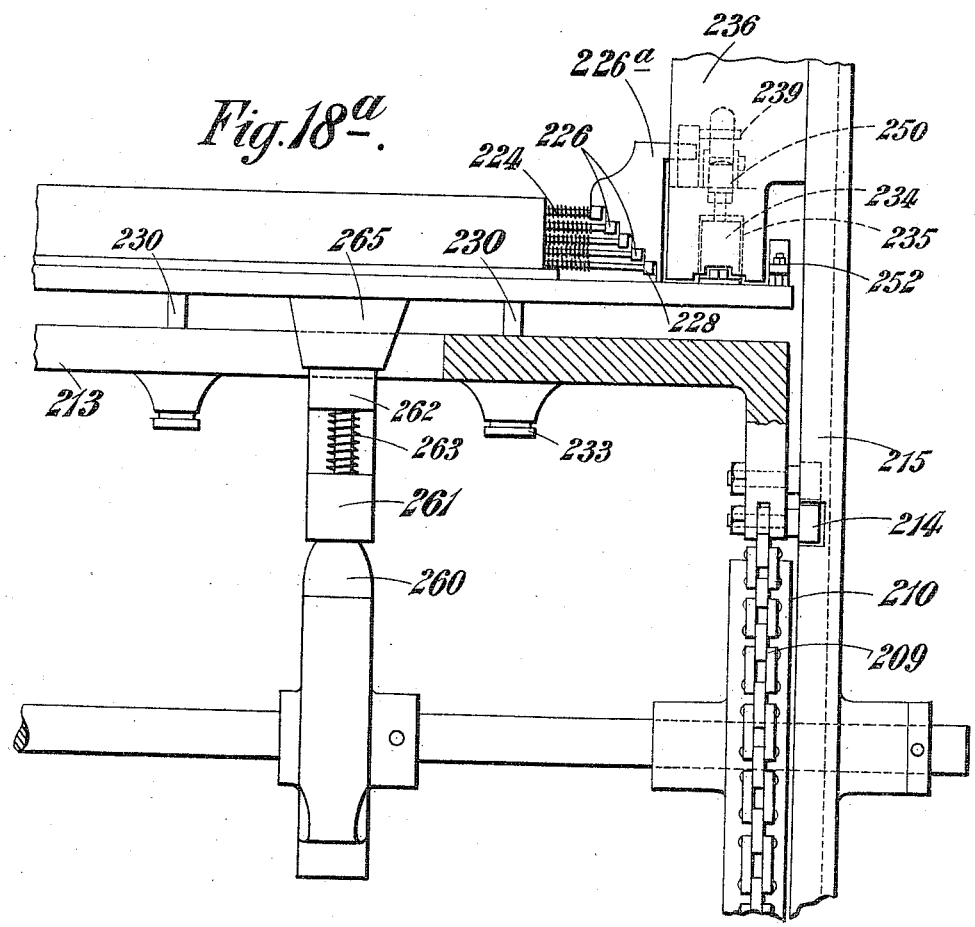

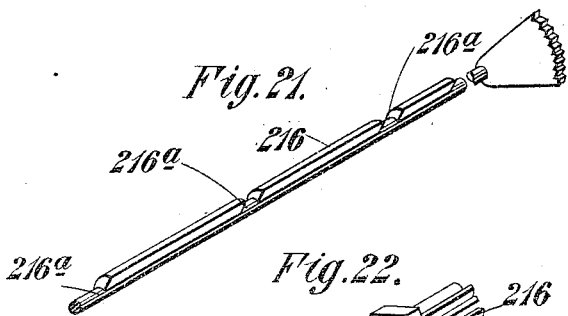
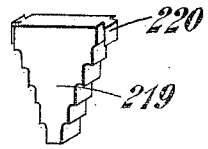
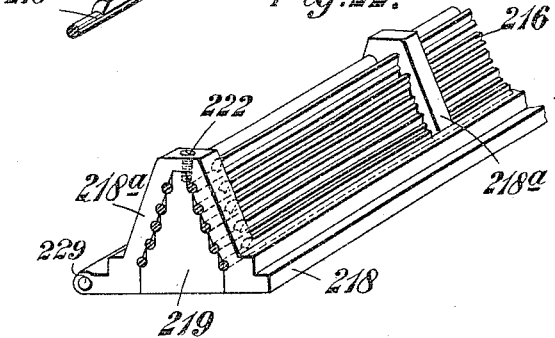
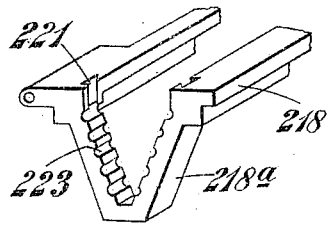
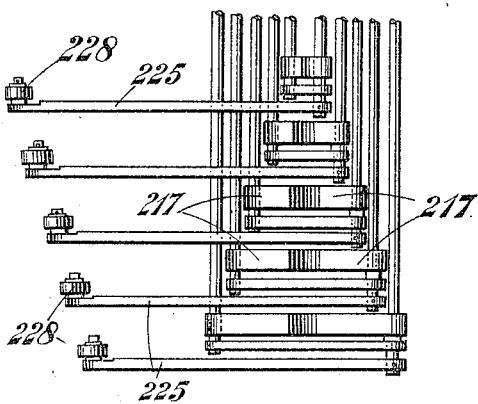
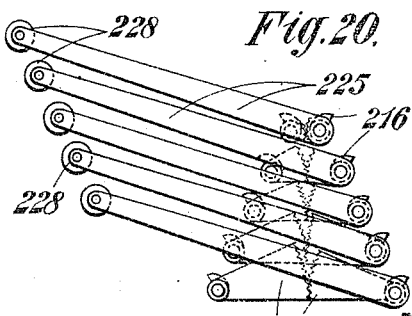

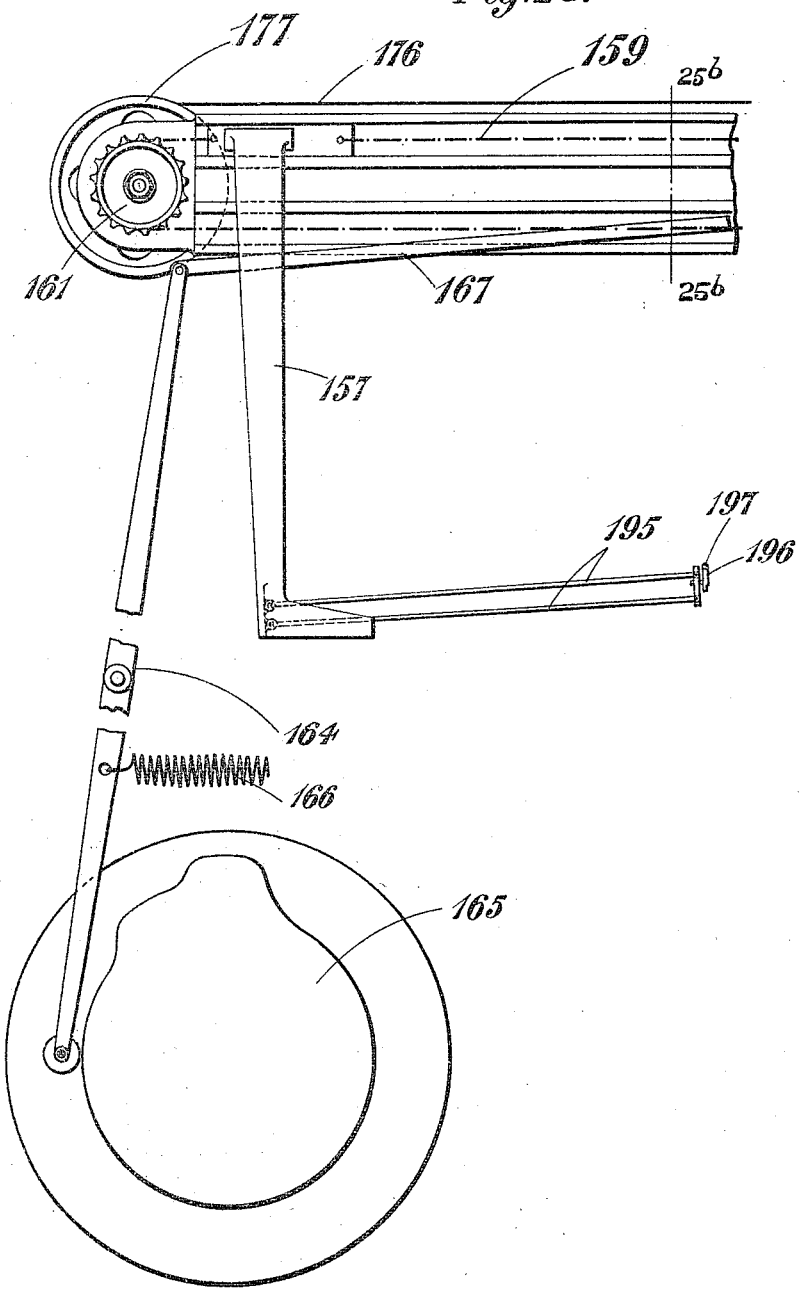

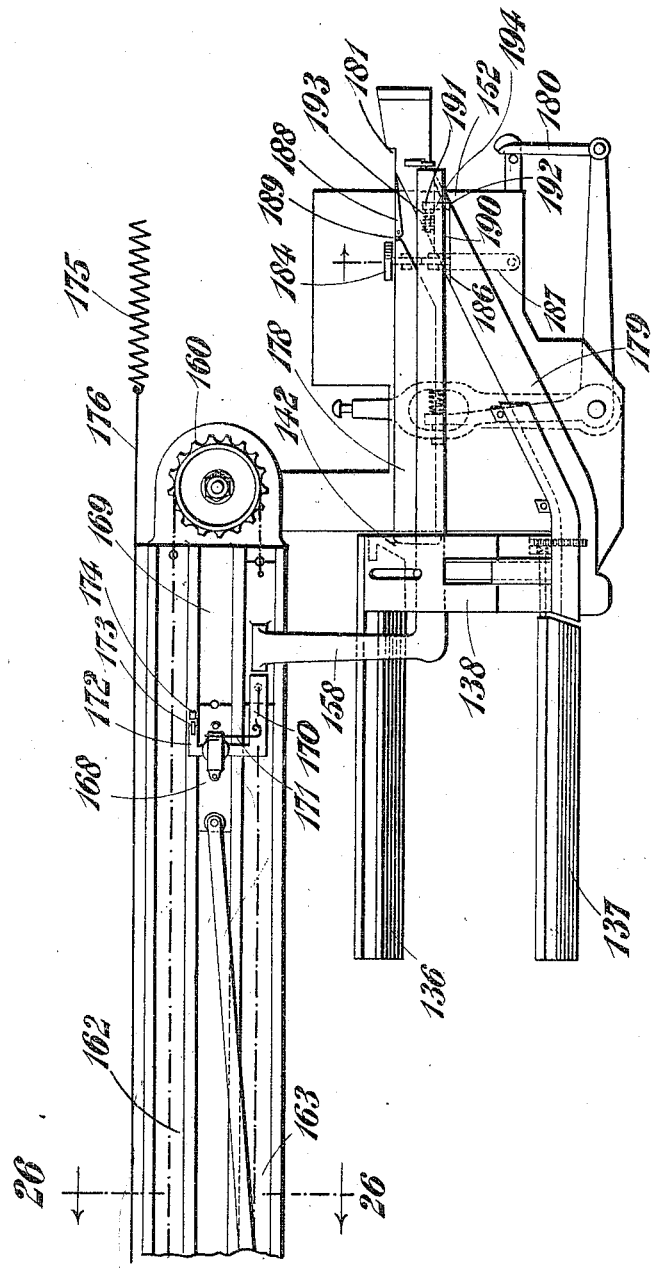

W. E. ELLIOTT.
LINOTYPE MACHINE.
APPLICATION FILED JUNE 1, 1908.
973,181.
Patented Oct. 18, 1910.
23 SHEETS—SHEET 19.
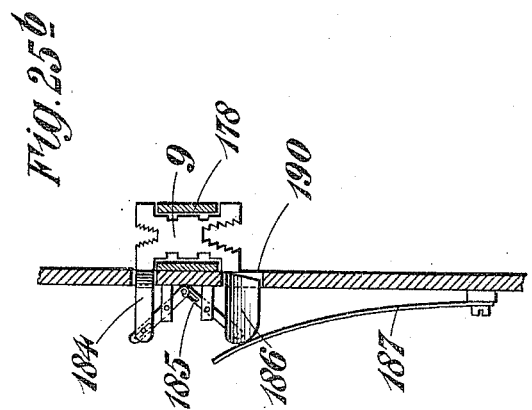
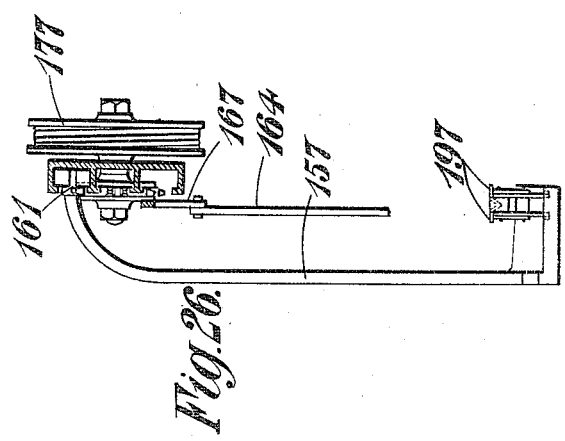
Witnesses
Inventor
W. E. Elliott
per Attorney

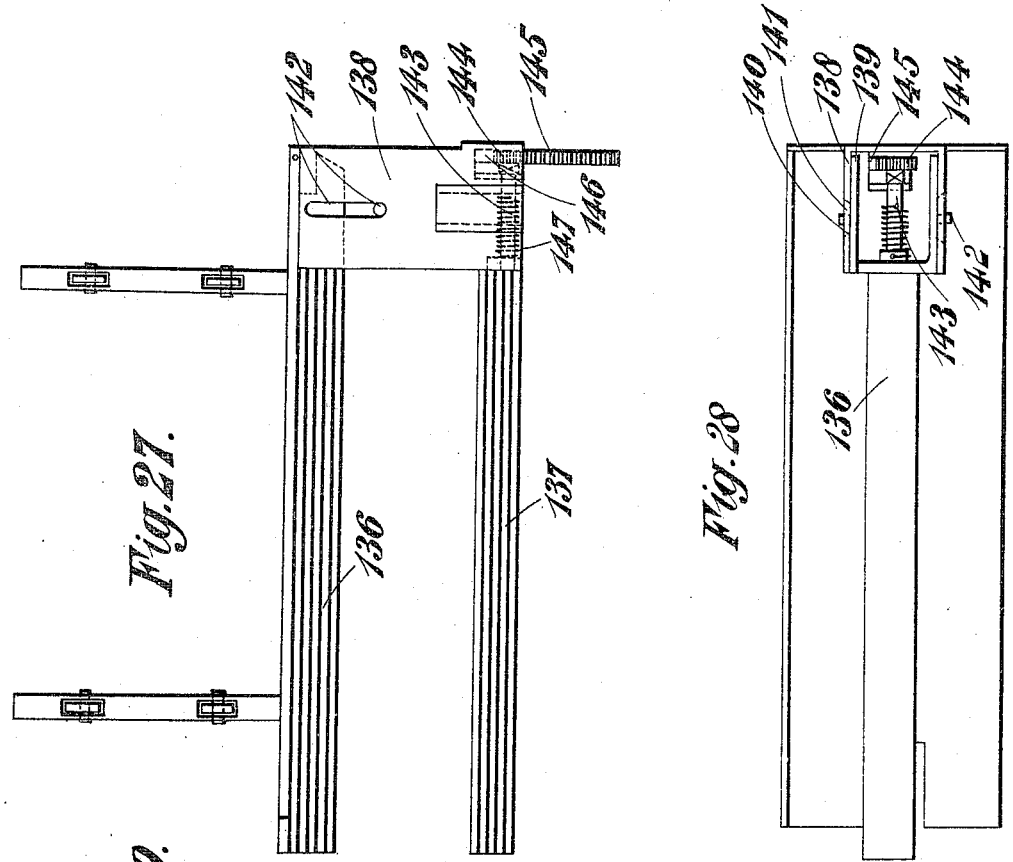
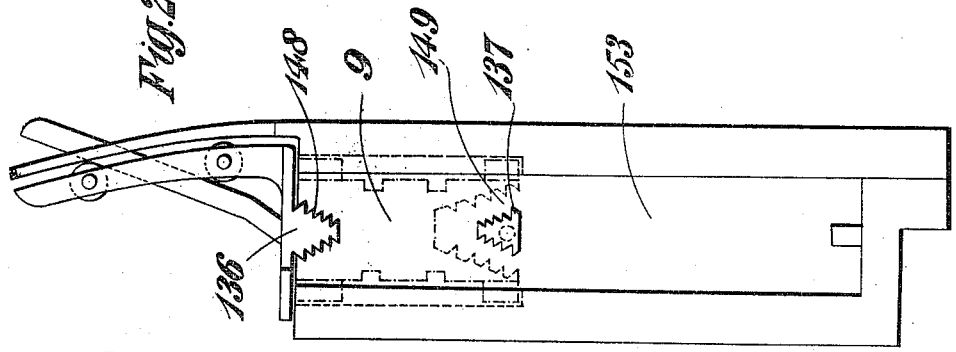

W. E. ELLIOTT.
LINOTYPE MACHINE.
APPLICATION FILED JUNE 1, 1908.
973,181.
Patented Oct. 18, 1910.
23 SHEETS—SHEET 21.
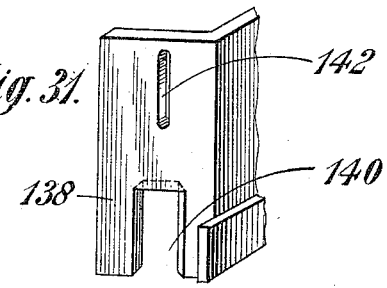
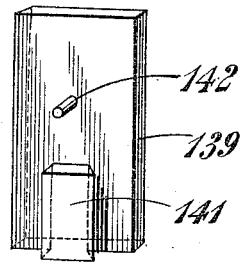
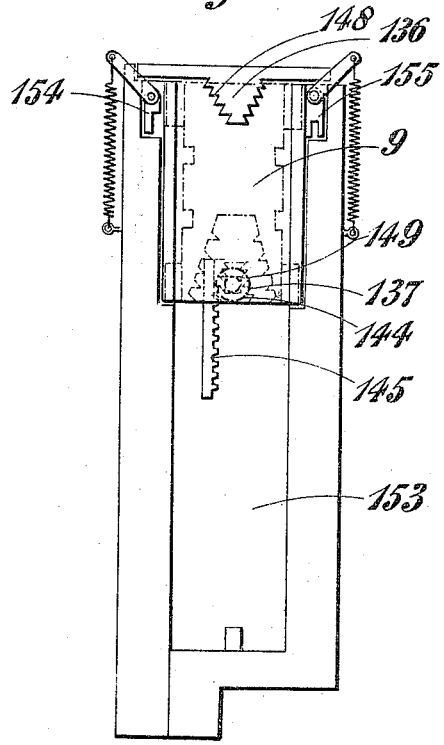
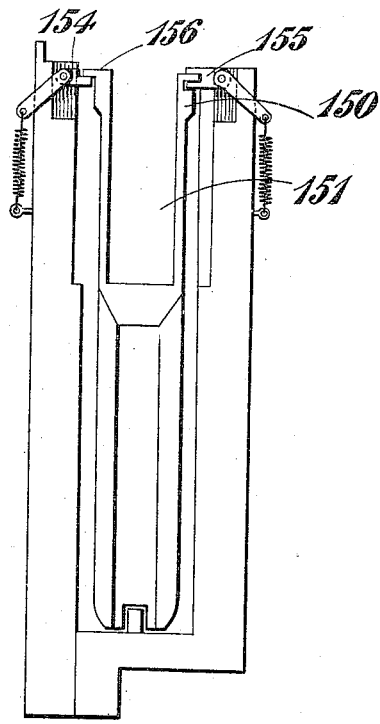
Witnesses
A. King
G. W. Hartley
Inventor
W. E. Elliott
per P. Dodge Attorney

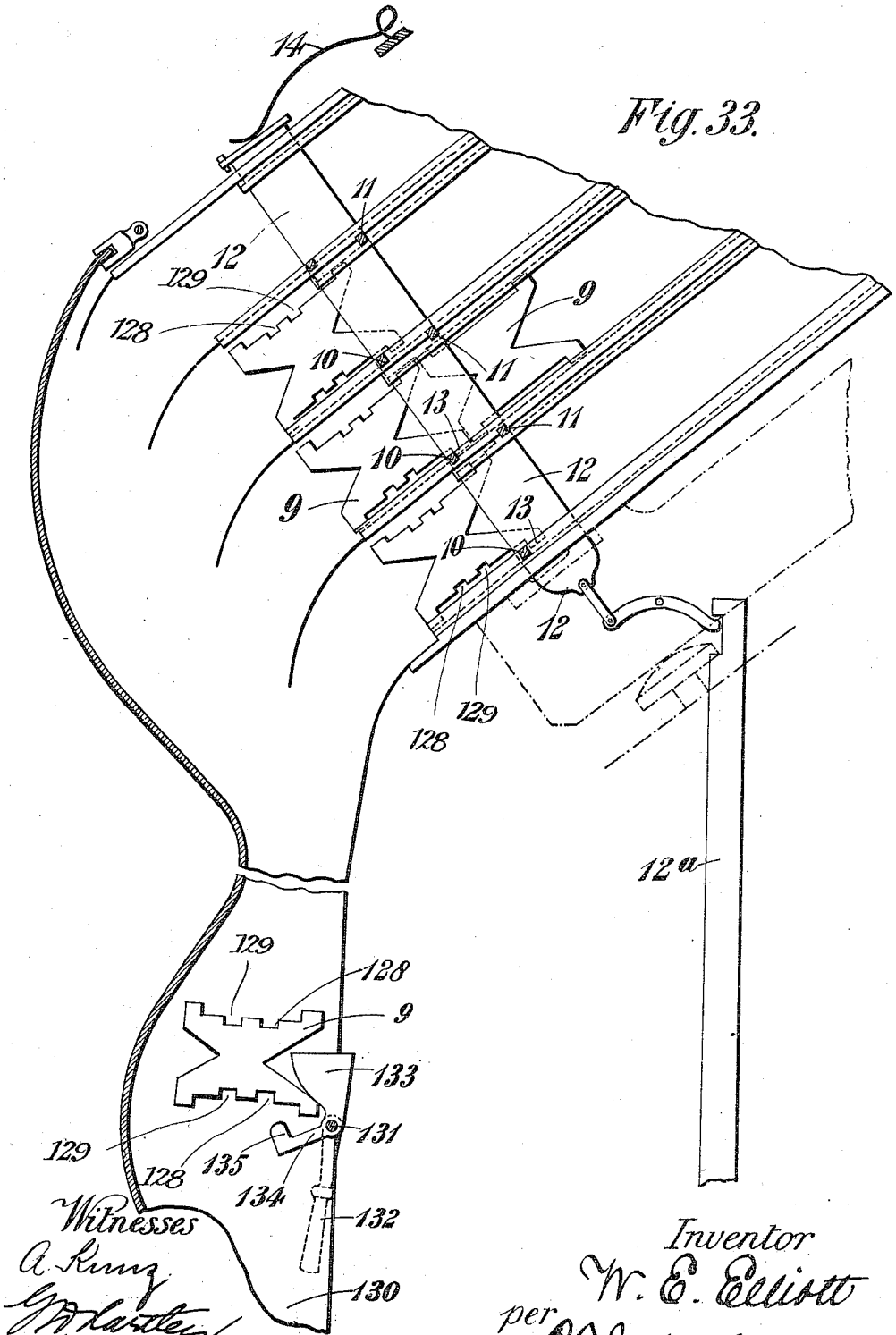

W. E. ELLIOTT.
LINOTYPE MACHINE.
APPLICATION FILED JUNE 1, 1908.
973,181.
Patented Oct. 18, 1910.
23 SHEETS—SHEET 23.
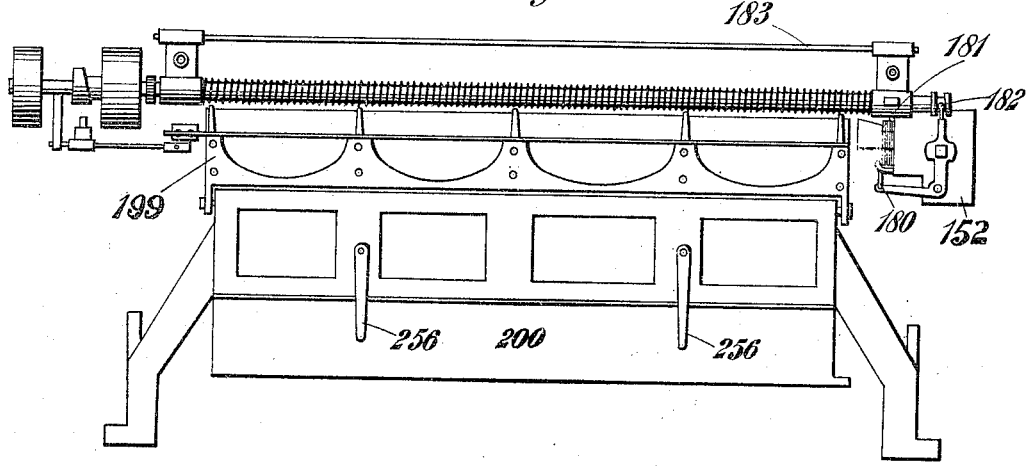
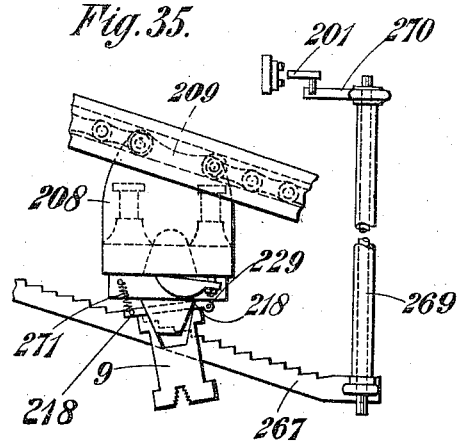
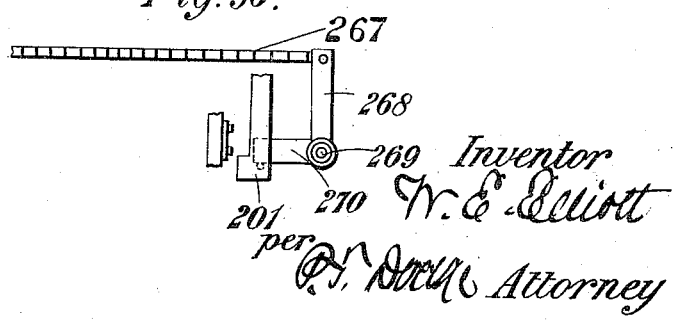

UNITED STATES PATENT OFFICE.

WILLIAM EBENEZER ELLIOTT, OF LIVERPOOL, ENGLAND, ASSIGNOR, BY MESNE ASSIGNMENTS, TO MERGENTHALER LINOTYPE COMPANY, OF NEW YORK, N. Y., A CORPORATION OF NEW YORK.

LINOTYPE-MACHINE.

973,181.  Specification of Letters Patent.  Patented Oct. 18, 1910.

Application filed June 1, 1908. Serial No. 436,158.

*To all whom it may concern:*

Be it known that I, WILLIAM EBENEZER ELLIOTT, a subject of the King of the United Kingdom of Great Britain and Ireland, and residing at 133 Salisbury road, Wavertree, Liverpool, in the county of Lancaster, England, have invented new and useful Improvements in Linotype-Machines, of which the following is a specification.
This invention relates to linotype machines having a plurality of magazines, from which the operator has at his immediate command, a large and varied assortment of faces for display work, and it has among its principal objects to provide improved mechanism whereby the operator, by a single operation, may effect a change of font and (when such change of font calls for it) a corresponding change of mold, to provide for the necessary increase or decrease in the body dimension of the linotypes or slugs to be thereafter produced; a further object of the invention being to provide improved distributing mechanism whereby the various matrices, of whatever font, are automatically distributed each into its proper channel of the respective magazine.

In the accompanying drawings which are to be taken as part of this specification and read therewith, the invention is represented as applied to a linotype machine of the well known Mergenthaler type described in the specification of Letters Patent No. 436,532, but it is to be understood that the invention is not restricted to that application.

In my improved machine, I combine with a series of magazines, each intended to carry a font or set of matrices, means for assembling the matrices from one or more of the magazines in a common line, the line to be presented and used in connection with the casting mechanism in the ordinary manner. The various matrix fonts will commonly comprise the same characters, but in different sizes or styles. A single keyboard representing the characters of one font is connected with a mechanism for delivering matrices from all the magazines. In order to prevent the delivery of matrices from more than one magazine at a time, each magazine is provided with movable means for locking the matrices therein. These locking devices are connected with a power driven mechanism, which is in turn controlled by fingerkeys, one key for each magazine or font; so that when one of these font keys is actuated, the matrices will be locked in all the magazines, and the matrices of the one magazine immediately unlocked; so that they may be delivered one at a time by means of the usual keyboard. The composed lines of matrices are delivered to a single distributer, which separates or distributes the matrices according to letter, regardless of font; matrices of the different fonts bearing the same letter being delivered at the same point into a receiver or holder. An endless chain of carrier bars or carriages travels beneath the receiver containing the separated matrices, and passes over the receiving ends of the magazines. As each of these carriers passes beneath the receiver, the bottom row of matrices is delivered thereto. The carrier advances with the matrices over the mouths of the magazines successively. It may carry the matrices of one or two, or more fonts. As each matrix arrives over its channel in the corresponding magazine, it is automatically released and permitted to fall into the magazine. As fonts producing characters of different sizes are brought into action, it is necessary to bring into action one at a time molds of different dimensions, adapted to produce slugs of the proper size to receive the type faces. In other words, a given font of matrices must be used in connection with a mold of suitable size. In order that the bringing of a particular font into action may be accompanied by the presentation of the proper mold, I provide a mold wheel carrying a series of molds, and I combine with this mold wheel, in addition to the ordinary means for giving it an intermittent rotation, means for turning it in such manner as to present one or another of the molds in operative position. I connect this supplemental means for turning the mold wheel with the above mentioned fingerkeys for bringing the respective matrix fonts into action; so that when a font key is actuated to bring a font of one size or another into action, it will also bring a suitable mold into action.

In order to increase the variety of characters used in the machine, I prefer to provide each matrix with characters in opposite edges; so that by inverting matrices the characters of one edge or the other may be brought into action.

I provide the machine with means by which the released matrices, passing to the line in course of composition, may be caused to stand either end up at will. As each line may be composed in part only of inverted matrices, I provide means whereby such lines are disintegrated, and the inverted matrices turned to their original positions before delivery to the distributing mechanism; so that all the matrices will pass to the distributer in their normal positions.

Figure 37:
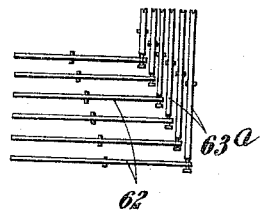
Figure 3:
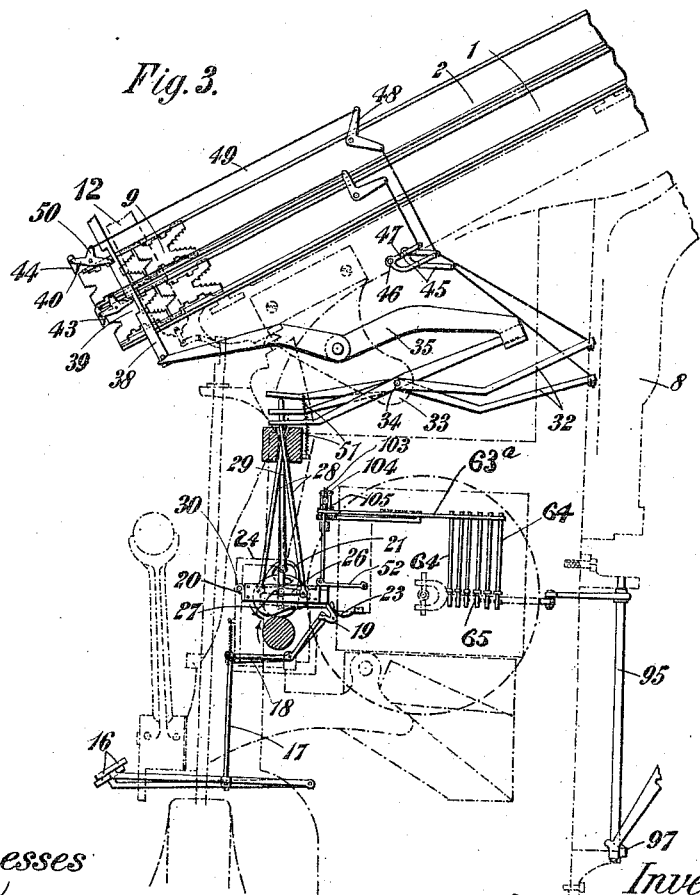
Figure 9:
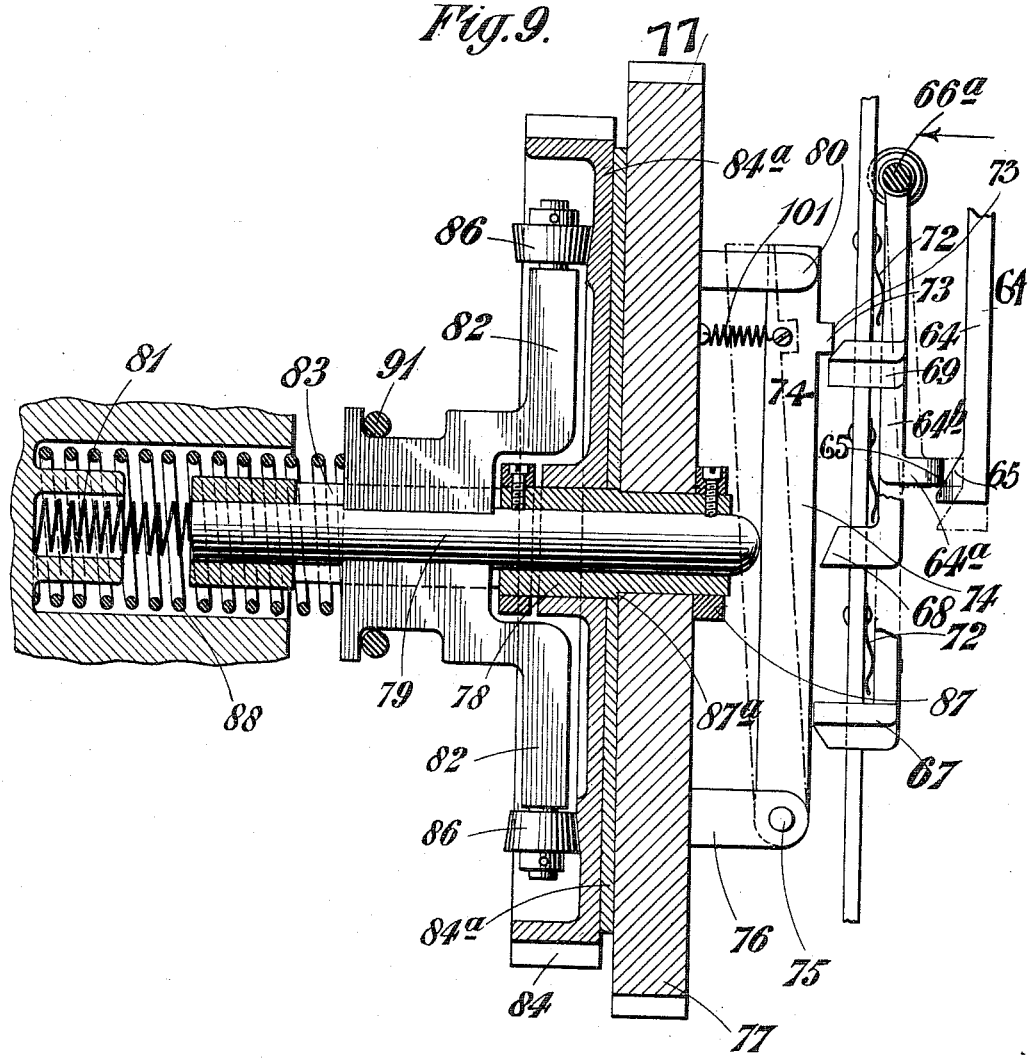

In the said drawings which are of a more or less diagrammatic nature and drawn to various scales:—Figures 1 and 1ª together form a sectional elevation as seen from the right-hand side of the machine showing sufficient of the apparatus to illustrate the present invention; Fig. 2 is a sectional front elevation of part of the same; Fig. 3 is a view similar to Fig. 1 showing parts of the apparatus in respectively different positions from those in which they are shown in the said Fig. 1; Fig. 4 is a plan of part of the clutch mechanism; Figs. 5 and 6 are plans of different portions of the gearing shown in Fig. 2; Fig. 7 is a plan partly in section on line 7—7 of Fig. 2, but drawn to a larger scale than the said Fig. 2; Fig. 8 is a side elevation of Fig. 9 looking in the direction of the arrow in that figure, and Fig. 9 is a vertical section taken about on line 9—9 of Fig. 8, of clutch mechanism used for adjusting the position of the mold wheel; Figs. 10, 11, 12, 13 and 14 are similar vertical sections showing the operation of part of the font distributer mechanism; Figs. 15 and 16 are side elevations partly broken away showing the operation of other parts of the font distributer mechanism; Fig. 17 is a detached portion of Fig. 15 or 16 showing the parts represented in other operative positions; Figs. 18 and 18ª together form a front elevation of a part of the font distributer mechanism, shown partly broken away; Figs. 19, 20, 21, 22, 23 and 24 are detail views of detached portions of the font distributer mechanism; Figs. 25 and 25ª together form a front elevation partly broken away of part of the general distributer mechanism; Fig. 25ᵇ is part of a vertical section on line 25ᵇ—25ᵇ of Fig. 25, but drawn to a scale larger than that to which the latter figure is drawn; Fig. 26 is a vertical section on line 26—26 of Fig. 25, viewed in the direction indicated by the arrows on that line; Figs. 27, 28, 29, 30, 31 and 32 are detail views of detached portions of the devices shown in Fig. 25; Fig. 33 is a sectional view, as seen from the right hand side of the machine, showing parts of the escapement mechanism; Fig. 34 is a rear elevation of the matrix receiver and parts adjacent thereto; Figs. 35 and 36 are views of portions of the automatic stop mechanism of the distributer apparatus; Fig. 37 is a plan of a detached part of the mold wheel adjusting mechanism, and Fig. 38 is a view of one of the space bars.

Like reference numerals are used throughout the several figures of the drawings for indicating like parts.

In the Mergenthaler linotype machine the matrices are stored in an inclined magazine from which they are released, in their order of composition, by key-controlled escapements, the released matrices being assembled in line and presented in casting position, and after the casting operation, they are distributed each into its respective magazine channel. According to the present invention, there are provided a considerable number, say twenty-five or thereabout, of the above-named magazines 1, 2, 3, 4, 5, 6, 7, etc., (portions of only nine are shown in the drawings, see Fig. 1,) all piled one above another, and secured on the frame 8 of the machine in any convenient manner. To avoid unnecessary repetition, the magazines are hereinafter referred to by the numeral 1, except when it is desired to particularize any one of them to the exclusion of the others, when each such magazine is referred to by its particular reference numeral.

The matrices 9 which are stored in the magazines 1, as in the before-mentioned linotype machines, are released therefrom, one at a time, by escapement pawls or dogs 10, 11 fast to rods 12 extending upward throughout the whole bank of magazines between the channels thereof, each such rod carrying a lower dog 10 and an upper dog 11, for each of the magazines, see particularly Fig. 33. In the arrangement illustrated, the release of the foremost of the matrices 9 is effected by the descent of the rods 12, these matrices, up to the moment of their release, being retained in the magazines by the engagement of the dogs 10 with the then lower rearmost of the matrix lugs 13. When therefore the rods 12 are lowered, as they are when a character key of the keyboard is depressed, and under the influence of springs 14, Fig. 33, the dogs 10 are disengaged from and release the foremost matrices and the dogs 11 are brought into the path of the topmost rear lugs of the next succeeding matrices, to momentarily arrest their descent and that of the following matrices. When the rods 12 are returned to their higher position (which is effected by suitable springs or the like acting on the escapement rods 12ª, Fig. 33) the dogs 11 are released from the matrices 9 and the dogs 10 are engaged therewith, thus returning the devices to their normal condition ready for the next matrix releasing operation. It will be understood that when the dogs 10 are carried downward with rod 12 to release the matrices, a matrix escapes from one magazine only, the matrices being retained in the other magazines by locking bars or cam bars 43, hereinafter described. It will also be understood that when dogs 11 are lifted out of engagement, the second matrix in the one magazine advances to the position previously occupied by the discharged matrix. The arrangement of dogs however is not an essential feature of this invention and may be varied without departing from the spirit of the invention.

In addition to the above-named character key levers there are provided a number of what are herein termed font keys 16, there being one of these font keys for each of the magazines 1, these font keys being located at any convenient part of, or adjacent to the ordinary keyboard, and pivoted to and guided by any convenient parts of the machine frame. Each of these font keys 16, as shown in Figs. 1 and 2, is connected through a link 17, with one end of a bent lever 18 whose opposite end is adapted normally to maintain a pivoted tumbler 19 in such a position as to support a pivoted cam-carrying carriage 20 in position to keep its cam 21 out of contact with a constantly rotating roller or cylinder 22. A series of springs 23 fixed to any suitable stationary support, bears one on each of the tumblers 19 to return it to its normal position, as hereinafter more fully explained. Each of the cams 21 is free to rotate in its carriage 20 in a manner similar to those now used in connection with the escapement rods of ordinary linotype machines, and, like those cams, its weight is so distributed that when the said cam is in its normal position, as shown in Fig. 1, there is a preponderance of weight which tends to turn the cam in the direction indicated by the arrow $a$ in that figure. To retain the cam in its normal position against the influence of the just mentioned weight-preponderance, an abutment or shoulder 24, Fig. 1$^a$, is provided thereon and adapted to engage with a stationary rib or abutment 25 when the cam carriage 20 is in its normal position. Each of the cams 21 is operatively fast to two diametrically opposed crank arms 26, 27 whose otherwise free ends are pivoted to the lower ends of two upwardly extending rods 28, 29 respectively, the operation of these devices, so far as described, being that as soon as a font key 16 is depressed, the corresponding tumbler 19, is tilted backward so as to withdraw its support from beneath the corresponding cam carriage 20, which thereupon descends so as to disengage the shoulder 24 from the abutment 25 and bring the cam 21 into frictional contact with the constantly rotating roller 22. This contact causes the cam 21 to rotate and, through the crank arms 26, 27, causes the two push rods 28, 29 respectively, to be alternately raised and lowered or vice versa, the carriage 20 itself meanwhile also being raised and lowered upon its pivot 30. As soon as the rotation of the cam 21 raises the cam carriage 20 clear of the corresponding tumbler 19, and the font key 16 has been released, the spring 23 of the said tumbler, returns the latter into the downward path of the cam carriage 20 and will, after the descent of the carriage on to it, prevent the cam of the latter from again coming into contact with the operating roller 22, until the font key 16 shall be next depressed.

The upper ends of the two push rods 28, 29, are caused to operate two separate levers 31, 32 respectively, coaxially pivoted at 33 either to stationary brackets 34 as diagrammatically shown in dotted lines in Fig. 1, or to any other suitable part of the machine frame. Of the two last mentioned levers 31, 32 (of which levers it is to be remembered there are two for each of the font keys 16) the lever 31, at its rearward end, is in operative connection with a lever arm 35 extending rearwardly from, and fast to, a rocking shaft 36, which, at or near its two ends, carries two arms 37 engaging the lower ends of notched rods 38 extending upward one at either side of the lower parts or delivery mouths of the magazines 1, and guided so that they are free to be moved in the direction of their length. The rocking shaft 36, the rearwardly extending arm 35 and the two side arms 37, constitute what is virtually a three-armed lever, and with the said rearwardly-extending arm 35 the rear ends of all of the levers 31 are in operative connection as shown best in Fig. 2. The two notched rods 38 engage, by their notches 39, the rearwardly-extending arms 40 of a series of three-armed levers which are hereinafter identified by the numeral 40 excepting in such cases as those in which the rearwardly-extending arms are themselves particularly referred to by that numeral. These levers 40 are pivoted one to each side of the upper part of the delivery mouth 41 of each magazine 1, each pair of the said levers, that is to say the two levers appertaining to the same magazine, having pivoted between their forwardly-extending arms 42, a cam bar 43 which, in one position, extends along the front of, and obstructs the outlet from, the said magazine mouth, that is to say, the mouth next below it, and, in another position it is raised above and clear of the said mouth, both of which arrangements are shown in Fig. 3. When the cam bar 43 is being depressed, first, the inclined cam surface 44 thereof engages the foremost of the matrices in the corresponding magazine and forces them upward, and afterward the flat surface of the said bar is presented to the matrices and serves to prevent them from leaving the magazine. The two notched rods 38 serve only for lowering the cam bars 43, the raising of the latter being effected by the means next described.

The before mentioned levers 32 which, as already explained, are operated by the push rods 29, are each linked to a lever arm 45 fast to a rock shaft 46, suitably supported beneath the lowermost of the magazines 1, and on which shaft there are also secured two arms 47, only one of which is seen in the drawings, see Fig. 1, operatively connected with two bell-crank levers 48 each pivoted to one side of the appropriate magazine 1 (or to the framing) so as to be free to rock in a vertical plane. The upstanding arm of each of the bell-crank levers 48 is operatively connected by a link 49 with the third arm 50 of the respective three-armed lever 40 this arrangement providing for the raising of the respective cam bar 43 from in front of the magazine corresponding to the particular font key 16 operated, the notches 39 in the rods 38 being sufficiently large to allow of this upward movement of the directly-operated cam bar 43 taking place without affecting the position of the other cam bars. In Fig. 3 this manner of adjustment is clearly illustrated, the cam bar 43 appertaining to the second magazine, counting from the bottom, being raised and leaving the mouth of that magazine unobstructed, while the cam bar appertaining to the other magazine illustrated, viz., the bottom one, is lowered and for the time being prevents the passing out therefrom of any of the matrices contained in such magazine. When any one of the font keys 16 is depressed and, as a consequence thereof, the push rod 29 appertaining thereto is operated; the two notched rods 38 are raised to effect the lowering of the last previously raised cam bar 43, and thereby the closure of the magazine last composed from, and also, by the cam surface 44 of such bar, the forcing backward or upward of the matrices in that magazine, out of frictional contact with the respective escapement pawls or dogs 10; the raising of the cam bar 43, corresponding with the particular font key 16 operated, and which results from the operation of the particular push rod 28 and levers 32, 45, 47 and 48, appertaining to that particular font key, places in operative condition the magazine containing the matrices of only that particular font, to the exclusion of all the other magazines which, for the time being, are rendered inoperative by the cam bars 43 thereof being in their lower positions. The lowering of the two notched rods 38 is effected by the turning of the particular three-armed levers 40, which correspond to the particular font key 16 depressed, and the lowering of the two push rods 28, 29 serves only to allow the parts respectively coöperating therewith, to return to their normal positions.

To each of the levers 31, 32 is connected a spring 51, Fig. 1, which serves to return it to its normal position when the respective push rod 28 or 29 is caused to descend.

The various font keys 16, and their coöperating mechanisms are arranged in groups according to the body dimensions of the respective fonts, for instance, the first group of font keys may be appropriated to fonts of bourgeois body, the next group to fonts of brevier body, the next group to fonts of minion body, the next group to fonts of nonpareil body, the next group to fonts of ruby body, and the next group to fonts of pearl body.

Over each of the cam carriages 20 appertaining to each of the just-named groups of font keys 16, there is provided a separate plate 52, all of the plates 52 being preferably pivoted near their rear edges, to the frame, upon a common pivot 53, this plate being tilted upward as shown in dotted lines in Fig. 1$^a$, whenever a cam carriage of the corresponding group is raised. This plate 52 serves to effect the stoppage of the mold wheel 54 at the particular part of its rotation at which a mold 55, 56, 57, 58, 59 or 60, having the body dimension appropriate to the selected font, is in the ejecting position, it being here explained that, as shown in Fig. 2, the mold wheel 54 carries a number of molds (55, 56, 57, 58, 59 and 60) of different body dimension, such number corresponding with that of the above mentioned groups into which the font selecting mechanisms are divided; in the example illustrated this number is assumed to be six. Each of the pivoted plates 52, through a vertical rod 61, acts on a horizontal lever 62, pivoted to a stationary plate 63, which latter may also serve for guiding the upper ends of the said rods 61. Each of the levers 62 is, at its rear end, in pivotal connection with one end of another horizontal lever 63$^a$, perpendicular thereto, as shown best in plan in Fig. 37, and whose other end is pivoted to the upper end of a vertical bar 64 having, at its lower end, a wedge or cam 65, Figs. 2 and 9. Each of the cams 65 is free to be raised and lowered by the respective lever 63$^a$ and, when so raised, is adapted to act on the back of a pivoted stop 66, 67, 68, 69, 70 or 71 to project it, against the action of a spring 72, into the path of a projection 73 on a lever 74 herein, for convenience, termed the "clutch wheel lever." The bars 64, see Figs. 8 and 9, are slidable and contact with projections 64$^a$ on arms 64$^b$ in connection with the respective stops 66, 67, 68, 69, 70 and 71 pivotally mounted on to the shaft 66ª, and the springs 72 are secured to any convenient part of the machine frame. The clutch wheel lever 74 is pivoted at 75 to a post 76 fast to a spur wheel 77 herein, for convenience, termed the "clutch spur wheel", this wheel being free to rotate upon a fixed horizontal hollow shaft 78. Within the hollow shaft 78 there is longitudinally adjustable a rod 79 with one end of which the clutch wheel lever 74 is constantly in contact, the said lever extending diametrically across the wheel 77 and being guided in a guide 80, and held in contact with the rod 79 as just mentioned, by a light spring 81. The rod 79, hereinafter termed the "clutch rod", has rigidly secured to it two arms 82 which project through longitudinal slots 83 in the hollow shaft 78 which latter has mounted on it a spur wheel 84 free to rotate and, to a slight extent, move horizontally thereon. Between the spur wheel 84 (which, as hereinafter explained, is geared with the so-called intermediate shaft 85, Fig. 5) and the clutch spur wheel 77, there is preferably provided a friction disk 84ª of leather or equivalent material which serves for causing the said clutch spur wheel to be rotated whenever the spur wheel 84 is pressed against or toward that disk. This pressure is produced through the arms 82 being moved toward the clutch spur wheel 77, the said arms being provided, on their outer ends, with rollers 86 so as to reduce friction. The clutch spur wheel 77 is prevented from moving longitudinally along the fixed hollow shaft 78 by an annular shoulder 87ª on the one hand and a fixed collar 87 on the other, as shown in Fig. 9.

The clutch rod 79 is longitudinally movable within the fixed hollow shaft 78 and is acted upon by the before-mentioned spring 81 and another spring 88, the former a comparatively weak one, and the latter a comparatively strong one, the weaker one (81) serving to maintain the above-named driving connection between the two spur wheels 77, 84, while being sufficiently weak to allow the said connection to be broken when the projection 73 on the clutch wheel lever 74 comes into contact with one of the before described stops 66, 67, 68, 69, 70, 71 and arrests the wheel 77. The spring 88 is so arranged as to have no practical effect on the clutch wheel lever 74 during the last mentioned unclutching operation, and serves to prevent the lever 74 from yielding sufficiently to pass the particular stop 66, 67, 68, 69, 70 or 71 with which its projection 73 may then be in contact. Nevertheless, the arms 82 may be retracted against the opposition of spring 88 by means of a suitable cam, 89, on the cam shaft 90, as shown in Figs. 1ª and 4. The retraction of the arms 82 permits the retreat of the spindle 79 and lever 74 with its projection 73 under the influence of spring 101, which connects the lever with the clutch spur wheel 77.

For the purpose of retracting the arms 82 and spindle 79 the two arms 82 are engaged by one end of a forked lever 91 pivoted at 92 to any convenient stationary part of the apparatus, the opposite end of the said lever being pivotally connected to a lever arm 93 fast on the upper part of a vertical shaft 95 which is free to turn in bearings 96 shown in dotted lines in Fig. 1. On the lower end of the vertical shaft 95 is secured a lever arm 97 whose vibrating end is engaged by one arm of a bent lever 98 pivoted at 99 to a suitable fixed part of the machine, and whose other arm carries an anti-friction roller 100 which bears directly upon the before-mentioned cam 89.

The before described stops 66, 67, 68, 69, 70 and 71 are situated at such parts of the path of the projection 73 as to effect the unclutching operations at such times as the selected mold 55, 56, 57, 58, 59 or 60 is in the ejecting position, a suitable brake, not shown in the drawings, being provided, if desired, for retaining the mold wheel 54 in the position thus arrived at.

Means are provided for preventing more than one of the before described pivoted plates 52 being raised at the same time, and for restoring each to its normal position when another one is raised for obtaining a change of body dimension. The means illustrated in Figs. 1ª and 2, for obtaining the just-mentioned results, consist of a flexible cord 102 extending over the horizontal levers 62, and made fast at its two ends to any suitable fixed parts of the apparatus. This cord 102 passes over movable pulleys 103 supported in standards 104 attached to the levers 62, and under stationary pulleys 105 situated between the said levers, there being in this cord just sufficient slack to allow of only one of the levers 62 being raised at a time, so that the raising of any one of the said levers causes the lowering of the other of them which had last previously been raised.

The spur wheel 84 is as stated geared with the intermediate shaft 85 through the gearing shown best in Fig. 5. In this arrangement the spur wheel 84 meshes with a pinion 106 which is fast on a countershaft 107 whereon is also secured a spur wheel 108 meshing with a pinion 109 fast on the intermediate shaft 85.

The clutch spur wheel 77 is in constant rotative connection with the mold wheel 54 through the following devices. The said spur wheel 77 meshes with a pinion 110 fast on a countershaft 111 which, through a pair of miter wheels 112, a shaft 113 and a pair of miter wheels 114, transmits rotary motion to a shaft 115 whereon is secured a pinion 116 in constant gear with the mold wheel 54. The mold wheel 54 is in constant gear with the pinion 117 by which it is successively turned through its two increments of motion with stops when the mold is in the casting and ejecting positions as in ordinary linotype machines, but this pinion, unlike those ordinarily in use, is secured to its shaft 118 by a ratchet device which admits of the mold wheel 54 receiving a further increment of motion through the last previously described gearing 116, 115, 114, 113, 112, 111, 110, and clutch spur wheel 77, which last named wheel is rotated through the friction disk 84$^a$ and the gearing 84, 106, 107, 108 from the intermediate shaft 85. The just-mentioned ratchet device comprises a cross bar 119 fast on the end of the shaft 118, see Figs. 2 and 7, and situated close to the front face of the pinion 117, and adapted to engage with any one of a series of pawls 120 pivoted in the said pinion and adapted, by springs 121, to be projected outward beyond the front face of such pinion. The springs 121 allow the pawls 120 to yield in a rearward direction but normally hold them projected from the pinion 117 in position to engage the cross bar 119, their outward movement, under the influence of the springs, being limited by suitable stops 122. The engaging ends of the pawls 120 are so directed relatively to the direction of rotation of the cross bar 119 that the said cross bar will abut against the particular pawl which, in its rotation, it first reaches, and through that pawl it will rotate the pinion 117. Supposing therefore a casting operation to be in progress and the operator, desiring a change of font, to depress a selective key, one of the stops 66 to 71 corresponding to that key will be projected as above described. The said stop will not however, engage the abutment 73 owing to the fact that the arms 82 are meanwhile retracted by the cam 89, as explained, so that the wheel 77 is turned idly, by means of the gearing 110 to 116, during the intermittent movements of the mold wheel 54. But, after ejection, the cam 89 permits of the closure of the clutch parts 84, 84$^a$, under the action of the spring 81 and the wheel 77 is then driven by the wheel 84 and in turn drives the mold wheel 54 until the abutment 73 strikes the projected one of the stops 66 to 71, at which moment, owing to the inclined surfaces of the stop, the lever 74 is forced back and pushes the shaft 79 with its arms 82 inward against the action of the spring 81. Immediately this takes place the clutch is loosened, so that the wheel 77 is no longer driven but the momentum will tend to force the abutment 73 past the selected stop and therefore cause further inward movement of the shaft 79. This further movement is resisted by the strong spring 88, which has now become sufficiently effective to prevent further movement of the wheel 77. Thus the mold wheel 54 has now received the further increment of motion mentioned and the selected mold is in the required position. The cam 89 is timed to allow of this selective operation and to then open the clutch 84, 84$^a$; therefore, when the next increment of motion of the wheel 54 is produced in the ordinary way, the newly selected mold will come to line-receiving position in place of the mold just previously used. When the mold wheel 54 receives a further increment of motion from the intermediate shaft 85 as before described, the pinion 117 is turned in the direction indicated by the arrow in Fig. 2, the pawl or pawls 120, as many as there may be, which is or are caused to pass behind the cross bar 119 during such turning movement being moved inward against the influence of the spring 121, through their contact with the said cross bar.

It is to be observed that the mechanisms for turning the mold disk have two distinct actions: first, the ordinary action, rotating the disk intermittingly, in order to present the mold which is for the time being in use first in the casting position, and thereafter in the ejecting position; and second, an independent rotation for the purpose of throwing the first mold out of its operative position and bringing another selected mold into a proper relation to the ordinary driving devices, so that it will in like manner be presented in the casting and ejecting positions. It is also to be noted that while the selecting keys serve to bring into action a mold corresponding to the matrices in that magazine which is at the same time brought into action, it is nevertheless possible for the operator to turn the disk ahead by hand at will, so that any one of the molds may be brought into use in connection with any font of matrices, this adjustment being permitted by the ratchet devices in connection with the mold turning pinion 117. In this manner it becomes possible to produce a small type face on a slug or body of large size when leaded matter is required.

The before-described mold wheel adjusting gear is located within the column 123, the springs 124, 125, Fig. 2, for actuating the delivery lever 126 and space-bar grabber 127—which springs are usually within that column—being removed from that position and placed preferably beneath the keyboard.

Each of the matrices 9, as shown best in Figs. 10, 11, 12, 13 and 14, has preferably two formative cavities 128, 129 oppositely disposed on each edge, the characters of the cavities 129 being inverted relatively to the characters of the cavities 128. The matrices are moreover formed with dissimilar recesses 148, 149, in their heads and feet respectively, the lower recesses being preferably larger than the upper recesses 148.

The arrangement of the nicks in these recesses might possibly be similar in some cases but will generally be dissimilar as shown in Figs. 10 to 12, and the reason for this will be well understood when it is hereinafter explained fully how one recess has an arrangement for distributing the matrix to one of a large number of receivers whereas the other recess only needs such an arrangement as will distribute the matrix to one of a, generally, much smaller number of magazines; all the nicks however are preferably of similar formation. To enable the linotype to be cast from the cavities which are presented upward in the magazines 1, any suitable device—such for instance as that described in the specification of Letters Patent No. 7475 of 1903—may be used for turning the matrices during their passage from the magazines 1 to the assembly box. A device such as that last mentioned, is shown in Fig. 33, and is fitted near the upper part of the assembler plate 130 and it consists of a rocking shaft 131 extending from side to side of the assembler plate and suitably journaled therein, so as to be capable of being turned about its axis by a hand lever 132 situated within convenient reach of the operator. On the shaft 131 there are secured two bars 133, 134 the former of approximately segmental form in cross section, and the latter, when in its effective position, forming a horizontal shelf and preferably having a bead or rib 135 extending along its foremost edge. Just at the front of the bars 133, 134 the front of the assembler plate 130 is bulged forward or outward to leave room for the turning over or inversion of the matrices.

When the linotypes are to be cast from the cavities 128, 129 which are presented downward on the matrices in the magazines 1, the hand lever 132 is raised into its highest position so that the bars 133, 134 will not project into the path of the descending matrices and therefore will not have any effect upon the said matrices, which latter would, in that arrangement, pass to the assembly box as in the ordinary linotype machine. When, however, it is required that the linotypes should be cast from the cavities which are presented upward in the matrices in the magazines 1, the hand lever 132 is moved into its lowest position as shown in Fig. 33, so that the two bars 133, 134 are caused to project into the path of the descending matrices with the result that these latter, in their descent, are caused to roll over edgewise in the manner represented in Fig. 33 and thereby become inverted. For again inverting the previously inverted matrices 9 so that they may be stored in the magazines 1 in their proper normal position, the second elevator, as shown in Figs. 25, 26, 27, 28, 29, 30, 31 and 32, is provided with two ribbed bars 136, 137, the bar 136 above the bar 137. The upper bar 136 is practically similar in construction and operation to those hitherto employed, and the lower one 137 is pivoted so as to admit of it being partially rotated for turning the ribbed faces thereof from their normal upwardly-presented position, to one in which they are presented downward, and vice versa. For this purpose the two ribbed bars 136, 137 are connected together by two housings 138, 139 which are capable of sliding one relatively to the other so as to enable the two bars to be moved away from, and toward each other. For this purpose the housings 138 may be provided with dovetail slots 140 adapted to slide upon dovetail ribs 141 provided on the housing 139, a pin and slot connection 142 serving to limit the relative motion of the two housings, the normal position of the pin, which is on the housing 139 in connection with the bar 137, being at the top of the slot which is in the housing 138 in connection with the bar 136. The upper bar 136 may be rigidly attached to its housing 138 which is herein, for convenience, termed the "upper housing", while the lower bar 137 is provided with a shaft 143 which is capable of turning in bearings in the housing 139 which is herein, for convenience, termed the "lower housing". On the shaft 143 is secured a spur pinion 144 adapted to gear with a rack 145 fast to the upper housing 138, the said shaft or the boss of the pinion 144 being provided with a flattened tangential locking surface, capable of engaging a rib 146 carried by the upper housing 138 for locking the lower bar 137 against rotation during a part of its downward and upward motion relatively to the upper bar 136; there is also preferably provided a torsion spring 147 encircling the shaft 143 and one end of which is attached to the said shaft and the other end thereof attached to a suitable part of the lower housing 139, the object of the said spring being to assist the lower bar 137 to turn in its bearings.

The last described apparatus operates as follows:—Assuming the first part of a line of matrices to have been assembled in the ordinary way, and the matrices of the other part to have been inverted, the said first part will become attached to the upper ribbed bar 136 by their upper notched recesses 148 as in the ordinary linotype machine, and the other part will become attached to the lower ribbed bar 137, all of the matrices having, in their feet, other notched recesses 149, hereinafter more particularly described, which, as shown in Fig. 29, are sufficiently large to avoid coming into contact or engagement with the ribbed bar 136 or 137 then respectively within them. The space bars 150, Fig. 38, have recesses 151 of sufficient depth or size to avoid contacting with both of the bars 136, 137. As the second elevator ascends to raise the line of matrices to the lift box 152, Fig. 25ª, it lifts the ribbed bar 136 and the lower ribbed bar (137 being connected with the upper ribbed bar) by the pin and slot connection 142, for a short period, remains stationary (its weight plus that of the then-inverted matrices engaged therewith, serving to assist in securing this result) during which time the engagement of the before mentioned tangential locking surface on the hub of the pinion 144 with the rib 146, prevents the said bar from rotating but permits of the sliding movement, the result being that the two sets of normal and inverted matrices 9 are moved apart, by reason of the separative movement of the bars 136, 137, sufficiently to allow the inverted matrices to be turned over into their normal position without their feet coming into contact with the upper ribbed bar 136, this turning of the matrices taking place when the pinion 144, by the further movement apart of the two housings 138, 139, travels over the rack 145. When, therefore, the second elevator is in its highest position, it has depending from it, two parallel sets of matrices, one above the other, and all the matrices having their feet presented downward. After the matrices have been, as hereinafter described, pushed off the second elevator, the latter is lowered, and during such descent the lower ribbed bar 137 is turned into its normal position ready to receive the inverted matrices of the line next to be distributed. At the parts of the intermediate space bar channel 153, Figs. 29 and 30, at which the before described housings 138, 139 enter it, there are provided two spring-controlled lips 154, 155, which, when in their up-turned position—in which they are normally held by the just mentioned springs—as shown in Fig. 38, constitute ledges for supporting the lugs 156 of the space bars 150. The lips 154, 155, are capable of yielding against the influence of their respective springs, under the pressure of the housings 138, 139, as shown in Fig. 30, to admit of the ribbed bars 136, 137 being brought to proper position in the intermediate space bar channel 153 for receiving the matrices 9.

To sweep the two sets of matrices off the second elevator into the lift box 152, the next described double shifter is employed. The two shifters 157, 158 comprised in this double shifter are operated through the medium of a chain or chains 159, represented in dot and dash lines in Fig. 25, which are guided around two pulleys or sprocket wheels 160, 161, in such manner that as the shifter 157 is caused to travel rightward, the other one (158) is caused to travel leftward, and vice versa. The two shifters 157, 158, are guided along suitable horizontal parallel tracks 162, 163 respectively, the former (157) being operated by the upper flight of the chain 159, which, for the purpose of this description, may be regarded as an endless one, and the latter (158) being operated, so far as regards its movement in one direction by the lower flight of such chain. The shifter lever 164 which is practically similar to those now in use in existing linotype machines, and is operated in respectively opposite directions by a cam 165 and a spring 166, is connected by a link 167, to a block 168, capable of reciprocating in a guide or track 169 between the two above-named tracks 162, 163. The block 168 carries a pivoted driver 170 adapted under the influence of a spring 171, to engage the shifter 158, for carrying it through its operative stroke, that is to say, from left to right of Fig. 25, this motion being derived from the before mentioned cam 165, which acts on the shifter lever 164 antagonistically to the cam spring 166. The normal position of the driver 170 relatively to the block 168 which supports it, is that in which it is ready for engaging the shifter 158, the spring 171 holding it normally in that position. The driver 170 is pivoted to the sliding block 168 in a bearing 172 wherein it is free to turn about a vertical axis, and its upper and lower ends or arms extend horizontally and parallel with each other, the lower one being that by which the engagement is made with the shifter 158, and the upper one being that by which the disengagement of the said parts is effected, as next described. At the end of the last-named operative stroke of the driver 170, the upper arm of the latter, which arm is preferably furnished with an anti-friction roller 173, makes contact with a stationary cam 174 which causes the driver 170 to be turned upon its vertical axis to disengage it from the shifter 158 which thereupon travels leftward under the influence of a spring 175, which is of less strength than the spring 166, and which operates the chain 159 in the direction which carries the shifter 158 to the left and the shifter 157 to the right, thereby moving the latter one through its operative stroke and the former one through its idle or return stroke. The spring 175 exerts its influence through a cord 176 fast to and coiled around a pulley 177 operatively fast to the before described sprocket wheel 161. When the cam returns the shifter lever 164 to its left-most position, the driver 170 during this leftward motion passes in front of the shifter 158, the said driver by its pressure against the shifter, being turned outward upon its pivot against the action of its spring 171 which latter returns the driver to its engaging position immediately it has cleared the shifter 158, by which operation the said apparatus is rendered ready for moving the next batch of matrices off the second elevator. The shifter cam 165 is so shaped as to hold both the matrix shifters 155, 158—before the second elevator has been raised—at a distance away from the lift box 152, sufficient to admit of the said elevator passing into the intervening space, and—after the matrices have been pushed into the lift box—at opposite ends of their respective strokes, so that, at the next cycle of the machine, the second elevator will have a clear way downward to its matrix-receiving position. It will thus be seen that this arrangements which gives opposite motions to the shifters has the characteristic advantage that both shifters can be held out of an obstructive position and that one shifter is ready to operate immediately the cam moves the driver.

The lift box 152 is provided with two tracks or sets of rails 178, 179, the former a horizontal one for receiving the matrices direct from the upper ribbed bar 136, and the other (179) an upwardly-inclined one adapted to receive the matrices direct from the lower ribbed bar 137, both of these tracks delivering the matrices to a point immediately over a lifter 180 at which point their onward progress is momentarily arrested by the gate or abutment 181 from which the matrices are successively disengaged as they are lifted one at a time by the lifter 180 which is vertically reciprocated by a cam 182, Fig. 34, on the shaft of one of the distributer screws 183, in the manner already well known in connection with existing linotype machines. Near their point of junction, the tracks 178, 179 are provided with automatic switches for enabling the matrices to be efficiently supported until they are acted upon by the lifter 180. As shown in Figs. 25ᵃ and 25ᵇ these switches comprise a cam piece 184 capable of sliding horizontally in a direction transverse to the direction of travel of the matrices along the horizontal track 178, and which sliding motion is imparted to the said cam piece 184 by the pressure against its curved or cam end, of the rear upper lugs 13 of the matrices 9 which are moved along the said horizontal track. This cam piece 184, through two centrally pivoted levers 185 or other convenient arrangement, is connected with a bar 186 which, when in its normal position, virtually forms a part of one of the inclined rails 179, but which, when the cam piece 184 is pressed back, as above mentioned, by the matrices traveling along the horizontal track 178 is simultaneously withdrawn out of the path of the rear lower lugs of the said matrices. A spring 187, Fig. 25ᵇ, serves to return the devices 184, 186 to their respective normal positions and to retain them in such positions until deflected therefrom by the matrices as last mentioned. Just before the horizontally traveling matrices reach the abutment 181 their upper lugs travel over two pivoted switches or gates 188 which virtually form continuations of the horizontal rails 178 but which are free to pivot upward upon their pivot 189 for a purpose later explained, and at this same part of the travel of the said matrices, their lower lugs pass through channels or slots 190 extending horizontally through the inclined rails 179 and which channels at their right hand end are normally closed by pivoted switches or gates 191, which, when acted upon by the horizontally traveling matrices, turn downward upon their pivots 192 against the influence of springs 193 which normally keep them closed, the said springs being at one end (the left-hand end in Fig. 25ᵈ) made fast to any suitable fixed part of the lift box 152 and at the opposite end attached to arms 194 operatively fast to the switches or gates 191. By the last described system of automatic switches or gates, the matrices traveling along the horizontal track 178, by acting on the cam surface of 184 move the bar 186 out of the path of the lower lugs of such matrices, and thereafter the upper lugs of these matrices pass over the two switches or gates 188, while the lower lugs pass along the channels 190 and push open the gates 191 which, by the springs 193, are closed immediately after the last of the batch of horizontally traveling matrices has passed the said gates. When the matrices are being propelled along the inclined track 179 these matrices are supported by the uppermost of their lugs 13 resting on the upper surface of the said track and their lower lugs traveling in contact with or being guided by the underside of the track, the rear upper lugs in their travel passing over the bar 186, and the top of the matrices by pressing against the underside of the switches 188 forcing the latter open, while at the same time the lower matrix lugs are passing beneath and being guided by the then closed switches 191. As soon as the last of the batch of ascending matrices has passed the switch 188, the latter by gravity fall into their closed position.

Instead of there being a cam piece 184 and bar 186 at only one side of the lift box 152, as indicated in the drawings, a similar device may be provided at the other side of the latter.

The lower shifter 157 is of such construction as to admit of its forward or pushing end following the matrices 9 up the inclined track 179, for which purpose it may comprise two parallel rods 195 in pivotal connection with the chain-propelled arm or shifter proper 157, and with a head 196 having two lugs 197, see particularly Fig. 26, adapted to travel along the inclined track rails 179.

The matrices 9 are raised by the lifter 180 into engagement with the distributer screws 183, see particularly Fig. 1, in the ordinary way, and these screws, conjointly with the well-known permuted distributer bar 198, distribute the matrices into the respective channels of a receiver entrance 199 which is pivoted to the top of a vertical receiver 200 having channels forming continuations of those in the receiver entrance each channel being adapted to receive matrices bearing the same printing character irrespective of font. In the receiver entrance 199 and receiver 200, there are as many channels as there are different characters in any one of the fonts of matrices employed in the machine, that is to say, assuming that there are ninety characters to each font, then there are ninety channels in the receiver 200, each channel being adapted to receive a matrix of each font but only of the same character, for example, the channel appropriated to the "d" matrices, may, at any time have within it matrices having "d" pica, "d" brevier, "d" bourgeois, "d" ruby, and "d" small pica formative cavities, and so on throughout the whole series of fonts whatever the number provided for by the machine. All the matrices bearing the same character, whatever the font, have their lugs of the same thickness so that they are free to run in the same receiver channel, for example, all the above-named "d" matrices would be so made.

The receiver entrance 199 is substantially similar to the magazine entrance of an ordinary linotype machine, the main difference existing in the fact that the former is vertical while the latter is inclined; this similarity is carried farther by the former being provided with an automatic clutch opener 201, Figs. 1, 35 and 36, which serves to stop the action of the distributer in the event of a matrix becoming jammed in any of the channels. The construction and operation of the last mentioned automatic clutch opener are sufficiently well known in connection with existing linotype machines, to render special description thereof in this specification unnecessary.

At the lower end of each channel of the receiver 200 there are provided two horizontally movable escapement pawls 202, 203 pivotally connected to an escapement lever or bar 204 which, in cross section, as shown in Figs. 10, 11, 12, 13 and 14, is practically of the same shape as the ordinary linotype escapement levers, but which, unlike those levers, is in pivotal connection with all of the escapement pawls 202, 203 instead of only one pair of them as heretofore. By turning this escapement lever or bar 204, on its pivot 205 in one direction all of the lower pawls 203 will be simultaneously withdrawn to release the lowermost matrix 9 from each of the several receiver channels, and, at the same time, all of the upper pawls 202 will be projected into the receiver channels to temporarily arrest the descent of the higher matrices, while, by turning the escapement lever or bar 204 in the reverse direction, that is to say, through its return stroke,—and this return stroke is effected by one or more springs 206 Fig. 1—all of the lower pawls 203 will be simultaneously projected into the receiver channels and all of the upper pawls 202 will be simultaneously withdrawn from such channels thereby allowing the matrices in the several receiver channels to simultaneously descend until checked by the respective lower escapement pawls 203; this latter position of the escapement pawls is the normal one.

The front plate 207 of the receiver 200, as shown best in Figs. 10 to 14 inclusive, terminates at its lower part, at a height such as to admit of the free passage beneath it, of a series of second or font distributer carriages 208 which are connected to two endless chains 209. These chains are, by suitable sprocket wheels 210, caused to travel in parallel vertical planes extending fore and aft of the machine, and they are adapted to present a series of font distributer bars 218 in turn first, by the upper flights of the chains, to the lower end of the receiver 200, there to receive matrices from as many of the receiver channels as then contain them, and then, by the lower flights of the chains, to the entrance mouth of each of the magazines 1, into which the matrices are respectively caused to fall according to their respective fonts. The font distributer bars 218, are each pivoted to a plate 212 which is slidably connected to another plate 213, inserted as, or suitably attached to, a link of each of the two chains 209, and at each end the said carriage is provided with rollers 214 adapted to travel along stationary tracks 215, preferably pivotally connected at 215ª, Fig. 1 to the machine frame 8, and by which tracks the carriages 208 are caused to travel at suitable distances beneath the receiver 200 and above the mouths of the magazines 1. Each of the font distributer bars 218 comprises a number of rods 216 herein, for convenience, generally termed "adjustable ribs" capable of being turned on their respective horizontal axes, and arranged in two series at an angle to each other so as to present, on general lines, a contour of truncated conical form. These adjustable ribs 216 are geared together in pairs by toothed sectors 217, or otherwise, see particularly Figs. 19 to 21, so that any one rib 216 on one side of the median plane of the distributer bar 218 will be turned whenever the companion rib on the opposite side of such plane is turned. The ribs 216 are of such shape in transverse section, as shown best in Figs. 10 to 14 inclusive, that, when they are turned into the position in which they are represented in Figs. 10, 12, 13 and 14, they constitute themselves into what is virtually a uniformly ribbed bar capable of retaining upon it any matrices having correspondingly toothed notches, and when turned in their other position, as shown in Fig. 11, they constitute what is virtually a non-ribbed bar.

The font distributer bars 218, or the portions thereof which are pivoted to the plates 212, are formed as frames the spaced vertical portions 218ª Figs. 22 and 24 of which, conjointly with blocks 219—one of which is shown separately in Fig. 23—constitute bearings in which the adjustable ribs 216 are free to turn, these ribs, at the parts 216ª at which they are to turn in the said bearings, being of circular form in cross section as seen in Fig. 21. The positions of the bearings considered relatively to the right-to-left or left-to-right dimension of the magazines 1, correspond with the positions of the supports between the top and bottom plates of the said magazines, the ribbed portions of the rods 216 extending along all such parts of the latter as are adapted to come into operative relationship with channels in either the magazines 1 or receiver 200. The blocks 219 see particularly Figs. 22 to 24 may conveniently be fitted to the frames 218 by dovetails 220 on the former fitting into correspondingly shaped grooves 221 in the latter, the two parts being secured together by screws 222 inserted into the smaller edges or ends of the blocks 219. By reference to Figs. 22 and 24 it will be seen that the vertical portions of the frames 218 are formed with the horizontal grooves 223 which constitute one half of the bearings of the adjustable ribs 216, the blocks 219, see Figs. 22 and 23, being so shaped as to retain the ribs in those grooves, and to admit of the ready separation or fitting together of the parts 218ª and 219 without disturbing the ribs 216. One of the adjustable ribs 216 of each pair thereof is provided with a spring 224, Fig. 18ª, which constantly tends to turn or hold it (and, through the respective gearing, its companion rib) in its effective or matrix-engaging position in which it is shown in Figs. 10, 12, 13 and 14, and it is further provided with a lever arm 225 adapted to be acted upon by certain abutments 226 Figs. 16, 17 and 18ª and tappets 227 Fig. 1 secured in place over the mouths of the respective magazines as hereinafter more particularly described, so as to cause the adjustable ribs 216 to be turned antagonistically to the said springs 224. The lever arms 225 are preferably provided with rollers 228 to reduce friction as much as possible, when they are brought into operative contact with the just-mentioned abutments 226 and tappets 227.

It has hereinbefore been briefly explained that the matrices 9, besides having the ordinary notched recesses 148 in their upper ends, also have notched recesses 149 in their feet; the notches or teeth of these latter recesses are permuted to form as many different combinations as there are different magazines 1 in the machine. It is with the recesses 149 that the font distributer carriages 208, or, more strictly speaking, the adjustable ribs 216 thereof, are caused to engage, all of the said ribs being turned inward upon their respective axes prior to receiving the matrices and all turned outward after receiving the matrices 9, and only those of them which are necessary, according to each particular combination, are turned inward when the matrices arrive over the particular magazine adapted to receive them.

The carriage 208 to which each of the distributer bars or frames 218 is pivoted at 229, comprises the two main parts 212 and 213, which, as shown best in Figs. 10, 11, 12, 13 and 14, are connected together by bolts or rods 230 attached to the part 212 and free to slide in sockets 231 in the part 213 by which means the distributer frame or bar 218 is free to be moved nearer to and farther from the chains 209, as shown in Figs. 10, 13 and 14 and Figs. 11 and 12 respectively. The part 212, in its normal position, as shown in Figs. 10, 13 and 14, is held close to the part 213 by means of springs 232 Fig. 12 which encircle the rods 230 and bear at one end against heads or enlargements 233 on these rods, and at the other end against the closed ends of the sockets 231, the said springs being of sufficient strength to support the weight of the parts 212 and the devices directly connected thereto, when they are inverted and traveling upward over the magazines 1. Each carriage 208 is also provided, at each end, with a taper registering block 234 which, when raised, as later described, is caused to enter a correspondingly shaped recess 235 formed in a stationary block 236 fixed to a convenient part of the adjacent framing, and serving to insure the carriage coming to a certain definite position. One of the last-named blocks 236 is provided with a series of movable abutments 226 (hereinbefore referred to) with which the rollers 228 of the before-described lever arms 225 are brought into contact when the respective carriage is raised. These abutments 226 are steps formed on the lower part of a spring-controlled bar 226ª—herein, for convenience, termed the "abutment bar"— which is adapted to slide vertically from the position in which it is shown in Figs. 16 and 17, and in which it causes the ribs 216 to be turned inward, to that in which it is shown in Fig. 15, in which it allows the said ribs 216 to be turned outward by their respective springs 224. The abutment bar 226ᵃ is normally retained in its lower position by a longitudinally sliding catch 237 which is moved into and normally retained in its engaging position by a spring 238 which, however yields when the top of the abutment bar 226ᵃ, in its descent, is caused to press against the inclined end of the said catch 237 and move the latter back out of the path of such bar 226ᵃ, only to be immediately thereafter shot forward by its spring 238; as soon as the abutment bar 226ᵃ has reached its lowest position, in which the said catch 237 retains it until it (the catch) is next released; this release of the catch 237 is effected by the following means. The said catch is provided with an upstanding arm carrying a stud 239, against which bears the upstanding arm of a bell-crank lever 240 upon whose other arm a short vertically movable rod 250 is pressed when the respective registering block 234 is raised into the corresponding recess 235, as shown in Figs. 15 and 18. When the rod 250 is raised as last mentioned, the bell crank lever 240 is turned on its axis and the catch 237 is forced back against the action of the spring 238, the abutment bar 226ᵃ being thereby released and immediately thereafter raised by a spring 251 which exerts a constant tendency so to raise it.

Each of the font distributer carriages 208 carries two cams 252, 253, the former adapted, during its approach toward the receiver 200, to act on a lever 254 which, when so operated, serves to depress the abutment bar 226ᵃ, and the latter (253, see especially Fig. 14) adapted, when the distributer carriage is leaving the receiver 200, to strike a roller 266 to open a door 255 hinged to the back of the said receiver, and normally held closed by springs 256, and which door serves to allow the matrices 9 to be moved out through the rear of the receiver without obstruction.
The abutment bar 226ᵃ acts on one arm of a bell crank lever 257 whose other arm acts on a stud 258 fast to the escapement lever or bar 204 in such a manner that when the abutment bar 226ᵃ is raised, it rocks the escapement lever or bar 204 so as to withdraw the lower escapement pawls 203 from, and project the upper escapement pawls 202 into, the channels of the receiver 200 as shown in Figs. 11 and 12, and when the abutment bar 226ᵃ is lowered, as it is through the before-mentioned cam 252 and lever 254, it allows the escapement lever or bar 204, under the influence of its spring 206, to be returned to the normal position in which it is shown in Figs. 10 and 16.

On the sprocket wheel shaft 259 beneath the receiver 200, there are secured cams 260 adapted, through levers 261 to raise each of the distributer bars 216 at the time at which it is beneath the receiver 200, this operation serving, through the abutment bar 226ᵃ, to turn the adjustable distributer ribs 216 inward, allow the lowermost of the matrices 9 to descend on to the font distributer carriage, and, by releasing the abutment bar 226ᵃ, allow the distributer ribs 216 to be turned outward to engage the downwardly-presented notched recesses 149 of the matrices 9. The cams 260 strike the rounded portions on the levers 261 to which are pivoted jaws 262 between which and the free extremities of said levers, springs 263 are interposed for absorbing shock which might otherwise be transmitted to the font distributer mechanism. The effective pressure exerted by the springs 263 upon the jaws 262 may be regulated by adjusting the screws 264 or by other equivalent devices, and the said jaws transmit pressure to the distributer carriages 212 through downwardly-extending projections 265.

By the onward movement of the font distributer carriages 208, the ribs or bars 216 thereof, loaded with matrices 9, as just mentioned, are conducted through the door 255, which is then opened as shown in Fig. 14 by the action of cam 253 upon a roller 266 on one end of the said door, after which the carriages 208 are traversed over the entrance mouths of the magazines 1, each of which is provided with the before-mentioned tappet or series of tappets 227 situated in the path of the rollers 228 on the lever arms 225, and which rollers in their onward movement are brought into contact with the said tappets, with the result that the distributer ribs 216 corresponding with the particular lever arms 225 thus affected, are turned inward and thereby released from the respective matrices 9. Each series of tappets 227 differs from all the other series and is therefore adapted to turn inward only those of the distributer ribs 216 which correspond with the particular permuted combination of font-distributer teeth carried by the matrices 9 appertaining to the respective magazine.

To prevent damage arising out of the jamming of a matrix 9 over the entrance mouth of the magazines 1, there is provided a toothed rack 267 suitably supported so as to be capable of longitudinal movement and in such a position as to enable it to be engaged by the part 218 of any of the font distributer carriages 208, which part may have been deflected downward upon its hinge or pivot 229, by one or more of the matrices carried thereon having its progress, over the magazines 1, arrested. The rack 267, as shown in Figs. 1, 35 and 36, is pivoted to a lever arm 268 fast to the lower end of a vertical shaft 269 on whose upper end is secured a lever arm 270 engaging with the before-mentioned automatic clutch mechanism 201, by which, as in existing linotype machines, the distributer clutch is opened and thereby caused to stop the distributer mechanism. The distributer frame 218 is normally held in close contact with the part 212 by springs 271 which are of sufficient strength to support the weight of that frame and the then-attached matrices when they are traveling upward over the magazines 1 while the said springs are sufficiently resilient to allow the parts 218 to be turned on their hinges 229 without undue resistance, when as before described, the progress of the matrices thereon is arrested. As the first or character distributer mechanism and the second or font distributer mechanism are both controlled by the same clutch,—that is the one just mentioned—it will be seen that both of these mechanisms will be thrown out of operation simultaneously when a matrix becomes jammed over the entrance of either the receiver 200 or the magazines 1.

To keep the matrices 9 apart from each other when they are attached to, and being carried along by the distributer carriages 208, the receiver 200, at its lower end, is provided with stationary partition plates 272 which extend under the hinged door 255, being so shaped as to pass beneath the latter as shown in Fig. 1. To the rear portions of the plates 272 are secured the upper portions of plates 273, and to the lower portions of the latter, are secured other plates 274, the plates 273 and 274 being practically concentric with the shaft 259, while at the back of the plates 273, there is a curved plate 275 which may be attached to the said plates 273 or supported in any other convenient manner. Beneath the lower series of distributer carriages 208 and extending fore and aft of the machine parallel with the line of travel of the matrices, there are provided a series of wires 276 arranged in pairs each of which pairs passes through, and in effect forms a continuation of one of the before-described plates 274, the said wires at their rear ends, being made fast to the second distributer casting or frame 277 and at their forward ends being screw-threaded and provided with nuts 278 whereby the tension of the said wires may be adjusted.

The operation is as follows:—The operator, having decided upon the particular font, depresses a selective key 16, whereupon the cam 21 is free to be revolved and to operate the rods 28, 29, the result being first the upward movement of the notched rods 38, whereby the last previously tilted lever 40 is returned to the position in which its cam bar 43 closes the magazine, as described, and secondly the rocking of the proper lever 32 the flexible connection of which tilts the proper or desired three-armed lever 40 and removes the corresponding cam bar from the mouth of that particular magazine. The depression of the key moreover results in the raising of one of the flaps 52, and in the lowering of any other flap which was previously raised, and the flap 52 now raised causes, by means of the linkage 61 to 64, the corresponding one of the stops 66 to 71 to be projected into the operative path of the abutment 73. The cam 89, having its recess opposite the roller 100, by means of the linkage 91 to 99 permits the arms 82 to close the clutch 84, 84ᵃ, under the action of the springs 81, 88, the spring 88 having, however, little, if any, effect on the arms 82 in the fully closed condition of the clutch. The lever 74 has now been moved forward by the spindle 79 so that its projection 73 will now be carried through its operative path, the pinion 77 being clutched to and driven by the wheel 84 and in turn driving the mold wheel 54, through the gears 110 to 116. When the projection 73 strikes the projected stop, the clutch is opened as above described and the pinion 77 is for the moment held by the engagement of the projected stop and the projection 73; simultaneously of course, the proper mold has been brought to, and is now held in, the starting position, the ratchet and pawl device 118 to 120 having permitted the mold wheel to overrun its normal driving gear. The depression of any ordinary character or other similar key of the key-board will now lower the bar 12, against the action of its spring, and the lowermost matrices of all magazines will be released, but only the magazine whose cam bar 43 is raised as aforesaid will deliver a matrix. The line having been assembled, the ordinary operations of casting, trimming and ejecting will now proceed as in the ordinary way. The matrices shown in the drawings have four formative cavities, as stated, so that it is obvious that prior to assembling the line the operator will have performed an adjustment of the lever 132, or will otherwise have accomplished a selective action such as will secure the desired position of each matrix upon arrival at the assembler. Ejection of the linotype having taken place, the line is elevated in the ordinary way for distribution, the matrices, some inverted and some right end up, being now supported between the two bars 136 and 137, the upright ones engaging the bar 136 and the inverted ones the bar 137. As the elevating movement commences, the slot 142 moves over its pin, permitting the bar 136 to move away from the bar 137, so that when the latter commences to rise, it is free to rotate through 180° and to bring the hitherto inverted matrices which it supports to the upright position. The matrices are now swept off the bar 136 by the shifter 158 and then off the bar 137 by the shifter 157, in the manner described, the matrices from the bar 137 passing up the incline 179, and the matrices 136 passing straight along to a support upon which they await the action of the lifter 180. The matrices are now brought into engagement with the ordinary screw 183 and the permuted bar 198 of the distributer by which they are distributed to the proper channels in a receiver 200. But, of course, a matrix in any particular channel may belong to any one of a number of magazines, as will now be understood, and must be distributed to its proper magazine. For this purpose it passes down the receiver 200, and is received by the particular one of the endless series of distributer or permuted bars 211 which happens to be at that moment beneath the receiver. As will be recollected, this bar in receiving position has all of its oscillatory members 216 turned inward by the action of the abutments 226 upon the lever arms 228, and is raised to the mouth of the receiver by the cam 260 and lever 261. This bar, with its complement of matrices, will now descend and will move forward, the matrices being kept separated by the partitions 273 and wires 276, as above described. As each bar 211 arrives over a magazine, certain of its levers 228 strike the projections of a permuted tappet 227 and are turned, thereby turning the corresponding bars 216 out of engaging position. Those matrices possessing the same number of nicks in their larger recesses as there are levers turned, will be dropped by the bar 211 into the magazine beneath, while the others will be retained by their nicks not disengaged and will pass on until they reach the magazine, the tappet of which is permuted to release them.

It will be seen that with matrices having two formative cavities on each edge, as is represented in the accompanying drawings, and therefore providing for a four-fold selection of character or face from each matrix, a machine having say twenty-five magazines, such as is hereinbefore described, will provide for a selection of one hundred different characters or faces. As regards the delivery of matrices from one magazine to the exclusion of the others, it is to be noted that my mechanism permits the employment of three, four, or more magazines, and the bringing of any one of these magazines into action at will by the depression of a finger-key. I believe the present to be the first mechanism of any kind by which this result is attained.

I claim,

1. In a line casting machine, a plurality of matrix magazines, a like number of movable devices, one for each magazine, to prevent the discharge of matrices therefrom, in combination with power-driven mechanism and intermediate connections adapted to render any one preventive device inactive and the others active at will.

2. In a line casting machine, three or more inclined magazines to contain matrices, movable devices, one for each magazine, adapted in one position to obstruct the outlet of its magazine, a power driven mechanism adapted to render one of said devices at a time unobstructive and the others obstructive, and manual devices for controlling the operation of said mechanism; whereby the operation of a manual device will cause the mechanism to automatically lock the matrices in all but one magazine, while leaving its matrices free for the ordinary devices.

3. In a line casting machine having a plurality of magazines, movable obstructive devices, one for each magazine, adapted to prevent the delivery of matrices therefrom; a selective mechanism, manually controlled, to remove the obstruction from any particular magazine; and a common closing mechanism, operative on all the obstructive devices in precedence to said selective mechanism; whereby the machine may be adjusted to permit the delivery of matrices from any one magazine, and at the same time prevent the delivery of matrices from all the other magazines.

4. In a line casting machine, plural magazines to contain matrices, and power actuated devices for locking all the matrices in the individual magazines; a series of finger-keys corresponding to the respective magazines; and power actuated devices controlled by the fingerkeys, and serving to unlock the matrices of one magazine at a time; whereby each key is enabled to unlock the matrices of one magazine while the matrices of all the other magazines are locked therein.

5. In a line casting machine, a series of magazines provided with escapements to release the matrices, a series of devices in addition to the escapements, for locking all the matrices in the respective magazines, fingerkeys corresponding to the respective magazines, and power driven connections through which the finger-keys control the locking devices of the respective magazines, to lock the matrices in one magazine at a time.

6. In a line casting machine, a plural number of magazines, and means for releasing individual matrices therefrom, in combination with means for locking the matrices in the respective magazines, a series of finger keys, one for each magazine, and intermediate connections, whereby the operation of any key causes the unlocking of the matrices in the corresponding magazine and the locking of the matrices in the other magazines.

7. In a line casting machine, plural magazines and escapements for releasing the designated matrices therefrom, in combination with a series of finger-keys, one for each magazine, power driven devices controlled by the keys and acting to lock the matrices in all the magazines, and means controlled by each key to effect the unlocking of the matrices in the corresponding magazines; whereby the matrices are first locked in all the magazines, and then unlocked as to one magazine.

8. In combination with a series of three or more magazines, a series of obstructive devices at their delivery ends, one for each magazine; means for moving said devices simultaneously to the obstructive position; and means for moving said devices one at a time to the unobstructive position.

9. In a line casting machine, a series of magazines, a corresponding number of devices distinct from the escapements for obstructing their delivery ends to retain all the matrices therein, and means for moving said obstructive devices simultaneously to the operative position, each device being movable independently of the others from the obstructive to the unobstructive position.

10. In a line casting machine, a series of magazines, a corresponding number of devices for obstructing their delivery ends to retain the matrices therein, means for moving said devices simultaneously to the obstructive position, means for moving said devices one at a time to an unobstructive position, and finger-keys, one for each magazine, controlling the movement of said obstructive devices.

11. In a line casting machine, a wheel provided with variant molds, a clutch mechanism by which said wheel is rotated, and finger-keys corresponding to the respective molds and controlling the clutch mechanism, to throw the same out of action when one mold or another is in operative position.

12. In a line casting machine, a wheel provided with variant molds, in combination with finger-keys and mold turning mechanism controlled by the keys; whereby the driving mechanism may be thrown out of action to leave one mold or another in operative position, as required.

13. In a line casting machine, a wheel provided with variant molds; in combination with means for rotating said wheel when the machine is in action; a secondary means for rotating the wheel; and a series of manual devices controlling the action of said secondary means; whereby the mold wheel may be turned in relation to the first rotating mechanism, in order to cause the presentation of one mold or another in the operative position.

14. In a line casting machine, the combination with a mold wheel carrying a plurality of molds in different angular positions thereon, of means to rotate it about its axis; such means comprising a pinion gearing with the mold wheel, and receiving motion from its shaft through automatic devices, which admit of the mold wheel being rotated through means other than said pinion, without rotating the pinion shaft.

15. A mold wheel, provided with a series of molds; a driving wheel 84, connected with the mold wheel through a clutch and gearing, substantially as described; finger-keys; and intermediate connections through which said clutch is controlled; whereby the rotation of the mold wheel will be controlled, to present one mold or another in operative position.

16. The driving wheel 84 for turning the mold wheel, and a clutch mechanism coöperating therewith; in combination with a clutch controlling lever, 74; arms 67, 68, etc.; cam 65; and fingerkeys controlling said parts; whereby the mold wheel may be rotated to, and stopped in, any desired position.

17. In a line casting machine, having a plurality of magazines for matrices of different fonts, the combination of a plurality of molds of different body dimensions; automatic driving and positioning gears for said molds; and manually controlled devices to bring into operative position any one of the magazines and the corresponding mold.

18. In a line casting machine, a wheel provided with variant molds; means for rotating the wheel when in action, as usual; further power driven means for giving said wheel a rotary adjustment in relation to the first named rotating means; and manual devices for controlling the action of the last named mechanism; whereby the wheel may be given a rotary adjustment in relation to its driving mechanism, so that it will present one mold or another in operative position, as demanded.

19. In a line casting machine, a mold wheel carrying variant molds in different angular positions thereon; driving means to rotate the wheel about its axis, as usual; supplementary driving means for imparting to said wheel a further rotation, according to the particular mold which is to be brought into use; and means for controlling the action of the supplementary driving means; whereby it may be caused to present one mold or another in operative position.

20. In a line casting machine, a mold wheel provided with variant molds, power driven mechanism for rotating said wheel, fingerkeys, one for each mold, and means controlled by the respective fingerkeys for throwing the driving mechanism out of action; whereby said mechanism may be caused to present a designated mold in operative position and then cease its action.

21. In a line casting machine, the combination of a mold wheel carrying a plurality of molds; normal driving means to turn the wheel about its axis; supplementary driving means, automatically operative on said wheel when the normal driving means is inoperative; and a manual selective mechanism to limit the operation of the supplementary driving means.

22. In a line casting machine, a mold wheel carrying a plurality of molds; in combination with a driving pinion 117, its shaft, and an intermediate ratchet mechanism; whereby the pinion is enabled to drive the wheel, and permit it to turn forward under the influence of the wheel when the latter is turned by other means.

23. In a line casting machine, and in combination with the mold wheel, the driving pinion 117, and ratchet connections through which it receives motion; a second wheel driving pinion, 116, and means for imparting motion thereto; whereby the pinion 117 is permitted to turn idly when the mold wheel receives motion from the second pinion.

24. In a line casting machine, the combination with a mold wheel carrying a plurality of molds in different angular positions, and a pinion gearing with the mold wheel, and free to rotate in one direction on its shaft; of a second pinion gearing with the mold wheel, and adapted to receive motion from the so-called intermediate shaft of the machine, and a clutch to automatically place the last named pinion in and out of operative connection with the intermediate shaft.

25. In a linotype machine, the combination of a mold wheel carrying a plurality of molds in different angular positions thereon, a pinion gearing with the mold wheel, free to rotate in one direction on its shaft, another pinion gearing with the mold wheel capable of receiving motion from the so-called intermediate shaft of the machine, a clutch adapted to automatically place the last named pinion in and out of operative connection with the intermediate shaft, and a manually operated device adapted to control the operation of the clutch.

26. In a linotype machine, the combination with a mold wheel carrying a plurality of molds in different angular positions thereon, and with the so-called intermediate shaft of such machine, of a spur wheel in permanent rotative connection with the intermediate shaft, a spur wheel in permanent rotative connection with the mold wheel, a clutch device adapted to place the two spur wheels in driving connection with each other, a clutch releasing lever carried by that spur wheel which is in permanent rotative connection with the mold wheel, and devices under the control of the operator, adapted to act on the clutch releasing lever at different parts of its rotation, to cause it to release the clutch, and with or without a cam to effect the said release at a certain definite part of the operative cycle.

27. In a linotype machine, the combination of a mold wheel carrying a plurality of molds in different angular positions thereon, of a lever in constant rotative connection with the mold wheel, a series of stop devices capable of being automatically projected into the path of the lever to arrest its rotation at different angular positions, and devices under the control of the operator adapted to control the operation of the stop devices.

28. In a linotype machine, the combination of a mold wheel carrying a plurality of molds in different angular positions thereon, a corresponding plurality of levers adapted to be operated through the actuation of a manually operated device, a corresponding plurality of cam bars operated by the levers, a corresponding plurality of stop devices which by the cam devices are moved into the path of a lever in constant rotative connection with the mold wheel, at respectively different parts of the said path, a wheel in constant rotative connection with the so-called intermediate shaft, and means controlled through the rotating lever of placing the said lever into and out of rotative connection with the last-named wheel.

29. In a line casting machine, a plurality of magazines to carry matrix fonts for different sizes of type; a plurality of molds corresponding to the respective sizes of type; fingerkeys representing the different sizes of type; and a mechanism controlled by the keys, to effect the coöperation of corresponding molds and matrices; whereby the presentation of matrices to a mold of improper size is prevented.

30. In a line casting machine; a series of magazines to contain matrix fonts for type of different sizes; means in operative relation to the respective magazines for locking all the matrices therein; a wheel provided with a series of molds corresponding in size to the different type faces; means for rotating said wheel, to bring one mold or another to operative position; a series of fingerkeys representing the different sizes of type; and a mechanism controlled by said keys, to unlock the matrices of one magazine at a time, and also effect the presentation of the corresponding mold in operative position; whereby any matrix font and the corresponding mold may be brought into action by the operation of the proper key.

31. In a line casting machine, the combination with a plurality of magazines, of a distributer operative to aline matrices with their magazine channels; a plurality of distributer carriages arranged to receive the alined matrices and carry them over the entrances to the magazines; and means to release the matrices from the carriage when they arrive over the corresponding magazine entrances; whereby the matrices are first distributed and located according to letter, and thereafter delivered to one magazine or another according to font.

32. In a line casting machine having a plurality of magazines for different matrix fonts, and means for assembling matrices from the different fonts in a common line; a distributer for separating the matrices in the composed lines according to letter, and regardless of font; and means for transporting the distributed matrices over the receiving ends of the magazines and delivering them individually to their proper channels in the respective magazines.

33. In a line casting machine, including plural magazines for different matrix fonts, and means for assembling matrices from different magazines in a common line; a distributer adapted to deliver matrices bearing the same character at the same point, regardless of font; a receiver or holder for said matrices; and carriages adapted to receive from the holder a series of matrices at one time and transport them to their proper channels in the respective magazines.

34. In a line casting machine, having a series of magazines for matrices of different fonts, an overlying, transverse distributer adapted to separate the matrices of all fonts acording to letter, and deliver those of the same letter at the same point, regardless of font; a stationary receiver or holder for said matrices; and carriage bars, each adapted and arranged to receive a number of matrices from the holder, transport them over the magazines, and deliver the individual matrices to the appropriate magazines.

35. In a line casting machine, a series of matrices having permuted distributing teeth, in combination with a plurality of magazines; a distributer for separating the composed matrices according to letter, and a carriage to receive the separated matrices and carry them over the respective magazines; said carriage provided with means for releasing the individual matrices over the appropriate magazine channels.

36. In a machine of the class described, having matrices with permuted teeth, the combination of a distributer mechanism adapted to distribute matrices according to character of face; a receiver or holder for said matrices, having channels equal in number to the different matrices in one font; an escapement mechanism to release the lowermost matrices from the holder; a distributing carrier arranged to receive the matrices from the holder and carry them over the successive magazines; and means for releasing the individual matrices over the appropriate channels in the magazines.

37. The combination of a distributer for separating matrices according to the characters thereon, and a holder to receive the distributed matrices; a magazine remote from said holder; and an intermediate carrier adapted to receive the matrices in series from the holder and deliver them to their magazine channels.

38. In combination with a channeled magazine, a traveling carrier extending in a line transversely of the magazine, and adapted to receive at one time a series of matrices belonging to the respective channels of the magazine, said carrier adapted to release over the magazine the matrices belonging therein; whereby matrices first separated according to letter may be transported to and dropped into the appropriate magazine channels.

39. In combination with a channeled magazine, a movable carrier arranged to stop momentarily thereover, and adapted to carry at one time matrices for all channels of the magazine, and means for effecting the simultaneous release of all matrices belonging in said magazine.

40. In combination, plural magazines; a matrix carrier lying transversely of the magazines and arranged to travel thereover, said carrier adapted to receive and hold a series of matrices; means for delivering at one time a series of matrices to said carrier in line with the magazine channels; and automatic means for causing the release of the individual matrices as the carrier presents them over the corresponding channels of the magazine.

41. In combination with channeled magazines, a series of transverse matrix carriers arranged to travel thereover and each adapted to carry a series of matrices for different channels of the magazine; means for distributing matrices of different fonts according to letter, and delivering such distributed matrices to the carriers; and means for automatically releasing the individual matrices, that they may fall into the appropriate channels.

42. In combination with the magazine, a transverse carrier, including movable members to retain a series of matrices thereon; and stationary devices for actuating said movable members as the carriers pass the respective magazines; whereby each matrix may be delivered to the proper channel in the proper magazine.

43. In a line casting machine, the combination with a plurality of distributer carriages, adapted to carry the matrices transversely over the entrances of a plurality of magazines, and portions of which carriages are adapted to move relatively to other portions; of a rack capable of being engaged by said relatively movable portions when an obstacle is presented to the movement of the matrices carried by the carriages; and a driving clutch in operative connection with the rack, to stop the movement of the distributer carriages.

44. In a line casting machine; a distributer, comprising an endless series of distributer carriages; distributers thereon, composed of rocking bars with arms thereon; and means for rocking the bars, that the distributer may receive and hold the matrices at the receiving position.

45. In a line casting machine having toothed matrices, a receiver or holder for said matrices; a channeled magazine; and a traveling matrix carrier, provided with movable members to engage and hold the matrices; an automatic means for moving the members when the carrier is in the receiving position, that the matrices may be received and held on the carrier; and means for again actuating the movable members when the carrier is over the magazine; whereby the matrices are released and delivered to the magazine.

46. In a line casting machine, and in combination, a distributer carriage, comprising a permuted bar and screw coöperating therewith; a receiver for the separated matrices; an endless series of carriages, intermittingly movable, transversely of the distributer bar; matrix retaining devices on each carriage; automatic means adapted to successively render said retaining means inoperative and operative while the carriage is in a receiving position; and automatic means adapted to render the retaining devices inoperative when the matrices are in position to enter the magazine.

47. In a line casting machine, a series of channeled magazines; transverse carriages, each adapted to carry a series of separated matrices over the magazines for delivery thereto; and longitudinal stationary guides between which the matrices travel; whereby the matrices are prevented from shifting laterally, and held in position to enter the magazine channels on arriving thereover.

48. In a linotype machine and in combination, a distributer comprising a coöperative permuted bar and screw, receivers for the separated matrices, an escapement at the delivery mouth of each receiver and operative to produce the single delivery of matrices, automatic means operative to simultaneously move all escapements at a predetermined instant in the cycle, an endless series of carriages intermittently movable transversely of said bar and screw, a matrix retainer on each carriage, automatic means adapted to successively render said retainer inoperative and operative while in receiving position, and automatic means adapted to render said retainer inoperative when brought to delivery position, substantially as set forth.

49. In a linotype machine and in combination, a distributer comprising a coöperative permuted bar and screw, receivers for the separated matrices, an endless series of carriages intermittently movable transversely of said bar and screw, a matrix retainer on each carriage, automatic means adapted to successively render said retainer inoperative and operative while in receiving position, spaced stationary partitions between the matrix receiving and delivery positions of said carriages, so disposed as to register with the walls of said receivers; so as to maintain the isolation of each of the matrices received by a carriage; and automatic means adapted to render said retainer inoperative when brought to delivery position, substantially as set forth.

50. In a linotype machine, matrices having permuted recesses or teeth in each end, and wherein the matrices are raised up to the distributer mechanism; the combination with the elevator by which the said raising is effected, of two ribbed bars, and means for inverting one of these bars during its travel from the higher to the lower position, or vice versa.

51. In a linotype machine employing matrices having permuted recesses or teeth in each end, and wherein the matrices are raised up to the distributer mechanism; the combination of an elevator for raising the matrices; two ribbed bars on said elevator adapted to engage said permuted recesses; means for inverting one of these bars during the descent of the elevator, and vice versa; a device adapted to push the matrices off the two ribbed bars in succession; and properly timed driving means operative upon the last named device.

52. In a linotype machine employing matrices having permuted recesses or teeth in each end, and wherein the matrices are raised up to the distributer mechanism; the combination of an elevator for raising the matrices, two ribbed bars on said elevator adapted to engage said permuted recesses; means for inverting one of these bars during the descent of the elevator, and vice versa; two shifters movable simultaneously in respectively opposite directions, and operative to sweep said matrices off said bars in succession; a driver operative upon said shifters; and timed cam and automatic return mechanisms operative upon said driver.

53. In a linotype machine employing matrices having permuted recesses or teeth in each end, and wherein the matrices are raised up to the distributer mechanism; the combination of an elevator for raising the matrices; two ribbed bars on said elevator adapted to engage said permuted recesses; means for inverting one of these bars during the descent of the elevator, and vice versa; a lift box; a horizontal track in said box with which one of said bars is registrable, an inclined track in said box with which the other of said bars is registrable; a terminus common to said tracks; a device adapted to push the matrices off the two ribbed bars in succession; and properly timed driving means operative upon the last named device.

54. In a linotype machine employing matrices having permuted recesses or teeth in each end, and wherein the matrices are raised up to the distributer mechanism; the combination of an elevator for raising the matrices; two ribbed bars on said elevator adapted to engage said permuted recesses; means for inverting one of these bars during the descent of the elevator, and vice versa; a lift box; a horizontal track in said box with which one of said bars is registrable; an inclined track in said box with which the other of said bars is registrable; a terminus common to said tracks; a distributing screw; a lifter operative to raise said matrices from said box to said screw; a device adapted to push the matrices off the two ribbed bars in succession; and properly timed driving means operative upon the last named device.

55. In a linotype machine having a plurality of magazines adapted to contain separable matrices of respectively different fonts; the combination of a continuous distributer operative to distribute the matrices according to character of face; and an intermittent distributer operative to distribute simultaneously a plurality of matrices according to font.

56. In a line casting machine, comprising a plurality of matrix fonts; means for composing matrices of different fonts in a common line; a series of channeled magazines; mechanism for distributing the matrices in the composed line, regardless of font, and arranging them in the order in which their receiving channels occur in the magazine; and means to transport the matrices thus arranged, a row at a time, over the magazines and deliver them individually to the appropriate channels.

57. In combination with a channeled magazine; a traveling carrier adapted to transport a row of matrices to positions over the respective channels of the magazine; and means for effecting the simultaneous release of the matrices, that they may enter said channels.

58. In combination with a channeled magazine, a carrier adapted to transport a row of distributed matrices thereto, and means for delivering said matrices simultaneously to said carrier.

59. In a line casting machine; a magazine; invertible matrices having characters in opposite edges; means for composing said matrices in line; means for inverting individual matrices in the line at will; a distributer; and a carrier in advance of the distributer, adapted to turn the inverted matrices to their normal positions.

60. In a line casting machine; invertible matrices provided with characters in opposite edges, and differentiated in form at opposite ends; in combination with means for assembling said matrices in line, either end up at will; a distributer; and means for erecting the inverted matrices in advance of the distributer.

61. In combination with a composed line of matrices, having characters in opposite edges, each matrix having its ends unlike in form; means adapted to engage the matrices in the line at their ends, and turn the inverted matrices so that they may all present like ends uppermost.

62. In a line casting machine, comprising invertible matrices with characters in opposite edges, and means for setting said matrices in the line, either end up at will; the combination of a distributing mechanism and a mechanism preceding the distributer for separating the inverted matrices from the line, re-inverting them thereafter, and delivering all the matrices in an erect position to the distributer.

In witness whereof I have hereunto set my hand in the presence of two witnesses.

WILLIAM EBENEZER ELLIOTT.

Witnesses:
W. P. THACKRAY,
W. J. ELLIOTT.